(12) United States Patent
Haghighat Kashani et al.

(10) Patent No.: US 11,481,457 B2
(45) Date of Patent: Oct. 25, 2022

(54) MENU PERSONALIZATION

(71) Applicant: Postmates, LLC, San Francisco, CA (US)

(72) Inventors: Ali Haghighat Kashani, San Francisco, CA (US); Bastian Lehmann, San Francisco, CA (US); Sean Plaice, San Francisco, CA (US); Oren Shklarsky, Vancouver (CA)

(73) Assignee: UBER TECHNOLOGIES, INC., San Francisco, CA (US)

( * ) Notice: Subject to any disclaimer, the term of this patent is extended or adjusted under 35 U.S.C. 154(b) by 176 days.

(21) Appl. No.: 16/201,762

(22) Filed: Nov. 27, 2018

(65) Prior Publication Data

US 2019/0163710 A1 May 30, 2019

Related U.S. Application Data

(60) Provisional application No. 62/591,726, filed on Nov. 28, 2017.

(51) Int. Cl.
*G06F 16/9535* (2019.01)
*G06F 16/9537* (2019.01)
(Continued)

(52) U.S. Cl.
CPC ........ *G06F 16/9535* (2019.01); *G06F 3/0482* (2013.01); *G06F 16/24578* (2019.01);
(Continued)

(58) Field of Classification Search
CPC ............ G06F 16/9535; G06F 16/9537; G06F 3/0482; G06F 16/9538; G06F 16/24578;
(Continued)

(56) References Cited

U.S. PATENT DOCUMENTS 6,236,974 B1 * 5/2001 Kolawa .................. G06Q 30/02
705/7.32
7,680,690 B1 * 3/2010 Catalano ................ G06Q 30/02
705/15
(Continued)

FOREIGN PATENT DOCUMENTS

CN 104750466 A * 12/2013 ............... G06F 9/44
JP 2003281244 * 10/2003 ............. G06F 17/60
(Continued)

OTHER PUBLICATIONS

Daraghmi et al., PMR: Personalized Mobile Restaurant System, 2013 5th International Conference on Computer Science and Information Technology (CSIT), pp. 275-282. (Year: 2013).*
(Continued)

*Primary Examiner* — Cheyne D Ly
(74) *Attorney, Agent, or Firm* — Dority & Manning, P.A.

(57) ABSTRACT

Provided are systems, methods, and computer-program products for generating a personalized item list. In various examples, a server computer on a network can receive a request that includes a user identifier. The computer can use the user identifier to look up a data model associated with the user identifier. The computer can further determine a geolocation, and use the geolocation to determine a list of items associated with an eatery at or near the geolocation. The computer can input the item list into the data model, for the data model to output a probability for each item, the probability indicating a likelihood that the user will select the item. The probabilities can be used to generate a personalized item list, which can be output onto the network for receipt by a computing device.

17 Claims, 11 Drawing Sheets

(51) Int. Cl.
  *G06F 16/2457* (2019.01)
  *G06F 3/0482* (2013.01)
  *G06F 16/9538* (2019.01)
  *G06N 20/00* (2019.01)
  *G06Q 30/02* (2012.01)

(52) U.S. Cl.
  CPC ...... *G06F 16/9537* (2019.01); *G06F 16/9538* (2019.01); *G06N 20/00* (2019.01); *G06Q 30/0261* (2013.01); *G06Q 30/0271* (2013.01)

(58) Field of Classification Search
  CPC . G06Q 30/0271; G06Q 30/0261; G06N 20/00
  See application file for complete search history.

(56) References Cited

U.S. PATENT DOCUMENTS

| | | | | |
|---|---|---|---|---|
| 2003/0225731 | A1* | 12/2003 | Vidgen | G16H 20/60 |
| 2006/0074279 | A1* | 4/2006 | Brover | G16H 20/30 |
| | | | | 600/300 |
| 2010/0161432 | A1* | 6/2010 | Kumanov | G06Q 20/102 |
| | | | | 705/15 |
| 2012/0233002 | A1* | 9/2012 | Abujbara | G16H 20/60 |
| | | | | 705/15 |
| 2013/0006802 | A1* | 1/2013 | Dillahunt | G06Q 30/0261 |
| | | | | 705/26.7 |
| 2014/0130095 | A1* | 5/2014 | Chen | H04N 21/482 |
| | | | | 725/46 |
| 2015/0199777 | A1* | 7/2015 | Rodriguez | G06Q 50/12 |
| | | | | 705/15 |
| 2015/0228004 | A1* | 8/2015 | Bednarek | G06Q 10/08355 |
| | | | | 705/26.8 |
| 2017/0308606 | A1* | 10/2017 | Jonsson | G06F 16/258 |
| 2019/0197153 | A1* | 6/2019 | Brewinski | G06F 16/2456 |
| 2019/0311445 | A1* | 10/2019 | Werner | G06F 16/287 |

FOREIGN PATENT DOCUMENTS

| | | | | |
|---|---|---|---|---|
| WO | WO 2005/066831 A1 * | 7/2005 | | G06F 17/00 |
| WO | WO 2015155885 A1 * | 10/2015 | | G06Q 30/02 |

OTHER PUBLICATIONS

International Patent Application No. PCT/US2018/062845, "International Search Report and Written Opinion", dated Mar. 1, 2019, 11 pages.

* cited by examiner

900

---

Retrieving, from a data store, data associated with a user identifier, the data store storing past item selections associated with a plurality of user identifiers, wherein each item is associated with an eatery, wherein each item is associated with a set of attributes, the set of attributes including whether a respective item was selected or not selected, and wherein the data that is retrieved includes particular past item selections associated with the user identifier
902

↓

Training a data model using the data, wherein the set of attributes associated with each particular past item selection provides categories for classification by the data model, and wherein, when trained, the data model outputs a personalized item list, the personalized item list predicting for a list of items probabilities that each item from the list of items will be selected
904

↓

Receiving, over the network, input corresponding to a particular list of items, wherein the request is associated with the user identifier
906

↓

Inputting the particular list of items into the data model to determine a particular personalized item list
908

↓

Outputting the particular personalized item list onto the network
910

*FIG. 9*

MENU PERSONALIZATION

CROSS-REFERENCES TO RELATED APPLICATIONS

This application claims priority to U.S. Provisional Patent Application No. 62/591,726, filed on Nov. 28, 2017, which is hereby incorporated by reference herein in its entirety for all purposes.

BACKGROUND

Computer-implemented recommendation systems attempt to present a computer user with a list of items that reflect the user's preferences. Recommendation systems can produce a list of items in various ways, such as through collaborative filtering or through content-based filtering. Collaborative filtering approaches build a model from a user's past behavior, which can be determined, for example, from previous items selected by the user. The model can then be used to predict items, or ratings for items that user may select. Content-based filtering approaches use a series of discrete characteristics of an item to recommend additional items with similar properties. In a hybrid approach, collaborative filtering and content-based filtering may be combined.

Recommendation systems can be used in various contexts to improve the user experience and/or to increase the efficiency of computing systems. Recommendation systems have been used, for example, to suggest items to a user when the user is perusing an online store. As another example, recommendation systems are used to by content streaming services to automatically select content, such as music, to output to a user. As another example, recommendation systems have been used to present movies or videos for a user to choose from.

BRIEF SUMMARY

A menu for a restaurant or another type of eatery presents a patron with a list of items offered by the eatery. Menu presentations, however, including digitized menus, may provide a patron with little assistance in choosing an item. In various examples, provided are systems, methods, and computer-program products for generating personalized item lists. A personalized item list can include menu items from one or more eateries. Using machine learning, a menu personalization service can learn the particular food preferences of a user, and can use this information to generate personalized item lists.

BRIEF DESCRIPTION OF THE DRAWINGS

Illustrative examples are described in detail below with reference to the following figures:

FIG. 9 includes a flowchart illustrating an example of a process for training a data model that can be used to generate a personalized list.

DETAILED DESCRIPTION

Figure 1:
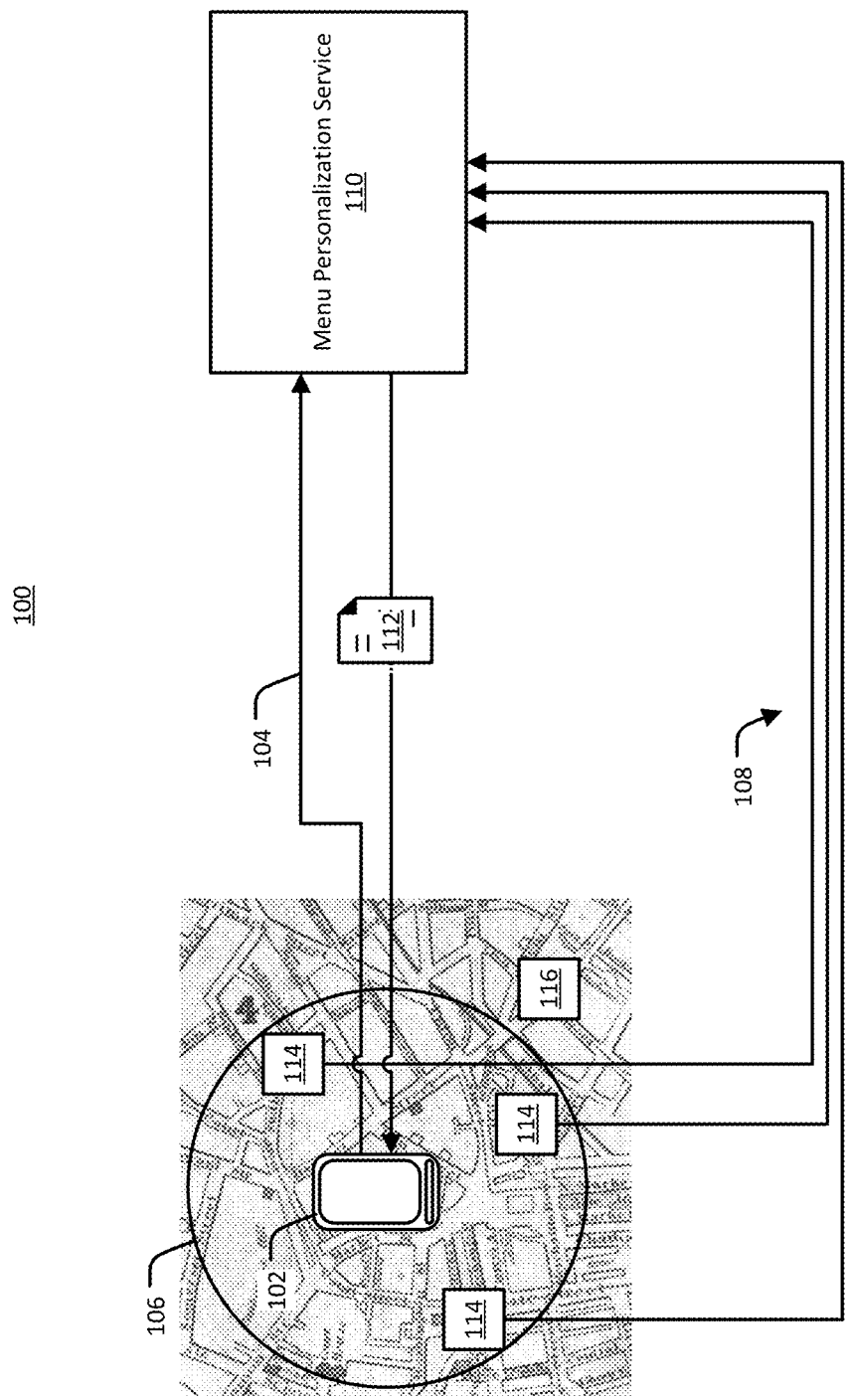
FIG. 1 is a diagram illustrating an example of a system for generating an item list that is personalized for a specific user.

A menu for a restaurant or another type of eatery presents a patron with a list of items offered by the eatery. Menus can be presented printed on paper or on a signboard, requiring no technology to be viewed and providing no mechanism to enable a patron to select a menu item. In these situations, selection of items from a menu may occur through interactions with employees of the eatery, with the patron having little to no interaction with any sort of digital technology. Computer technology has enabled eateries to present patrons with digitized menus. For example, an eatery can present a patron with a tablet computer, through which the patron can view and possibly also select the items the patron wants to order. As another example, an eatery may enable a computer user to view the eatery's menu through a website or an application (referred to, in some contexts, as an "app"), through which the user may also be able to select and order items.

Menu presentations, however, including digitized menus, may provide a patron with little assistance in choosing an item. Menus may be organized by food type (e.g., drinks, appetizers, entrees), and items on a menu may include a brief description of the components of the item and/or a technique used in preparing the item. But printed menus may provide no further assistance, and thus require that a person read the menu and digest the information provided in order to determine items to select. Digitized menus may be able to use a user's past orders to suggest to the user that the user order these items again. In some cases, an eatery's digital menu may include a recommendation system that can suggest to a user items that are similar to items the user has selected in the past. Some users, however, may be interested in trying new things, rather than reordering the same things over and over again. Additionally, similarity systems may fall short when applied to widely different menus (e.g., the user previously ordered pizza and is looking to make selections from a menu for a Thai restaurant). Furthermore, a recommendation system that focuses only on similar items may be insensitive to factors such as differences in preference related to the time of day, day of week, or the current season, geographic availability (e.g., if the user is traveling), and/or current availability of certain items.

The listing of items that represent an eatery's menu can thus be improved upon by computer technology, not only to assist eatery patrons in selecting items but also to help people make better eating choices. Some eatery menus can present a patron with over one hundred items to choose from, which can be time consuming to ingest and can quickly lead to decision fatigue. Individuals with food allergies or other dietary restrictions have to make an even greater effort to find foods that fit within their restrictions. Research has shown that decision fatigue can lead to people making less healthy dining choices later in the week than earlier in the week. A recommendation system that outputs eatery menus that are closely tailored to each individual person's needs and preferences can ease a person's the decision-making burden, as well as enable a person to make better food choices.

In various implementations, provided are systems, methods (including computer-implemented methods) and computer-program products for or including servers on a network. A server can implement or execute steps for training a data model that is associated with a particular user. The training data can come from past item selections associated with the user, retrieved from a data store for storing such information. In some examples, the past item selections can include items selected and/or items not selected. In various examples, the components of a particular item can provide categories for classification by the data model. Various machine learning techniques can be used to train the data model. The techniques discussed herein result in a unique data model being generated for each individual user of the system, so that a particular data model represents the specific preferences of the user associated with the data model.

By using training data that is associated with a particular user, a data model trained on this data may more accurately reflect the preferences of the person associated with the user, over other methods for developing such models. Other systems may attempt to improve a user's recommendations by trying to find other users who are "similar" to the given user. Food preferences, however, may vary widely among people with the same demographic profile. Considering a particular user's choices when developing a data model may thus result in the model more closely reflecting the specific preferences of the user. Additionally, by using the components of an item as classification categories, as well as various attributes associated with the selection of the item, the data model may provide better recommendations over a system that only examples the similarity between menu items. For example, by incorporating dish ingredients, the data model may show high probability that a user will select a chicken but a low probability when the dish includes coconut. Consideration of the components of an item and attributes related to the selection or non-selection of the item may thus result in recommendations that better reflect a user's preferences.

In various implementations, the server can further implement or execute steps for using a data model to generate a personalized item list. Upon receiving a request for a personalized item list, the techniques discussed herein include determining a geolocation of the user. The geolocation can then be used to determine an item list of an eatery at the geolocation, and/or item lists of eateries in the vicinity of the geolocation. The item lists can then be input into a data model for the user, which can output probabilities associated with each item, where the probabilities reflect a likelihood that a user will select an item. The probabilities can then be used to sort the items in the list or lists. In various examples, the system can apply additionally processing to the item lists, such as filtering and scoring. The final list produced by these and other techniques described herein can then be presented to the user on a computing device of the user.

The techniques discussed herein thus improves on the eatery menu by producing a menu that is personalized to each specific user. Additionally, incorporating the user's geolocation takes into consideration that the items the user is selecting from and the user will, in the near term, need to be in the same location, so that the user can consume the items. This may not be a consideration in other recommendation systems, where there are not physical items that need to be moved, or there are more generous time constraints on when the items need to be moved.

FIG. 1 is a diagram illustrating an example of a system 100 for generating an item list that is personalized for a specific user. The example system 100 includes a menu personalization service 110, which can communicate, over various networks, with computing devices on the networks, including the illustrated computing device 102. In various examples, the personalized item list 112 is associated with a geographic location (which can also be referred to as a geolocation 106). The personalized item list 112 can include, for example, items from the menus of one or more eateries in the geographic vicinity of the computing device 102, another computing device, or a location that is designated in another manner. As discussed further below, the menu personalization service 110 can sort and/or filter the items presented to the user of the computing device 102 so that the items in the personalized item list 112 reflect the user's preferences.

A user, in the context of the example system 100, is a digital entity that is maintained by a computing system, and for which various types of digital identifiers may exist that associate data with the digital entity. For example, a user can be identified to a computing system by a username, which can be an alphanumeric string. In this example, the username can be associated with a user account on the computing system and/or on a network. The user account can further be associated with authentication data, such as a password, a security token, bioinformatic data, or other data that can be used to give a person access to the account, or to give the account access to the computing system. As another example, a user can be identified by an email address, a social media handle (e.g., a type of username), a gaming handle, a mobile telephone number, or another type of identifier. In some examples, one person can be associated with multiple user accounts, and thus can be represented as more than one user within a computing system or network. In some examples, one user can be associated with multiple email addresses, social media handles, or other identifiers. In some examples, more than one person (e.g., a human being) can be associated with the same user. For example, a team of network administrators may each have access to the same user account.

One or more users can be associated with the illustrated computing device 102. For example, the computing device 102 can be a laptop or desktop computer connected to the network of a company, and available for use by the employees of the company. In this example, the employees can log into the employees' user accounts with the company using the computing device 102. As another example, the computing device 102 can be a person's smartphone. In this example, the person may have multiple accounts with various service providers (e.g., email providers, social media sites, e-commerce sites, etc.), and may be able to access these accounts using the computing device 102.

The computing device 102 can be a network-enabled device that includes an integrated circuit for executing computer code (e.g., a processor or a Central Processing Unit (CPU)), memory for storing program code and other data, and a network interface for communicating with a network. Examples of network-enabled computing devices include smart phones, tablet computers, personal digital assistants, and laptop computers, among others. Computing devices can further include devices such as desktop computers, server computers, gaming consoles, smart home devices such as doorbells, thermostats, and/or refrigerators, and dashboard consoles in automotive vehicles, among other examples. The network interface of a network-enabled computing device can include a socket for connecting a network cable and/or an antenna for communicating with Wi-Fi networks and/or cellular networks. In some examples, a computing device 102 can further include location capability; that is, the ability to determine or indicate the device's geographic location. For example, the computing device 102 can include a Global Positioning Service (GPS) receiver and/or software for determining the device's location using nearby cell towers.

In various examples, the computing device 102 can execute software applications, such as web browsers, email readers, text editors, applications for viewing maps and/or obtaining geographic directions, and others. In various examples, one or more of the software applications that can be executed by the computing device 102 can enable a user of the computing device 102 to view item lists of eateries.

An eatery can be a restaurant or other place where people can be served food. Eateries can thus include restaurants where patrons are served by wait staff, establishments where patrons order at a counter and can eat at the establishment or take food with them, fast food restaurants, delis and deli counters, coffee shops, juice bars, ice cream parlors and dessert shops, and so on. In some examples, eateries can also include mobile eateries, such as food trucks. In various examples, an eatery can inform patrons of the items carried by and/or available from eatery using a physical menu or a signboard on which are printed the items. Alternatively or additionally, the eatery may include a kiosk or terminal through which patrons can electronically view the items.

The system 100 of FIG. 1 includes eateries that are, in some manner, connected to a network, such as the Internet. For example, an eatery may run a website, or subscribe to a service that runs a website on behalf of the eatery. In this example, the eatery's menu may be available on the website and, in some cases, the website may include interfaces for ordering items from the eatery, either for pick-up or delivery. As another example, the eatery may produce, or contract another to produce, an application that can be executed on the computing device 102, and through which a user can view the eatery's items. In some cases, the application may also enable the user to order items from the eatery, for pick-up or delivery. As another example, an eatery may be subscribed to an ordering service that enables network users to view the menus from many eateries, and order items from the eateries. In some examples, the ordering service can incorporate delivery service. An example of an ordering service that includes delivery is the service provided by Postmates, of San Francisco, Calif.

As another example, the computing device 102 can be one provided by an eatery on site. In this example, the computing device 102 can execute a software application that enables patrons can to view items available from the eatery, and possibly also to order items. For example, an eatery can include kiosks or terminals with graphical displays and user input devices (e.g., touch screens, keyboards, etc.) that enable patrons to view items on the menu and possibly also to select items. As another example, an eatery may use tablet computers or other portable devices at the table, instead of printed menus.

In various examples, the eateries in the system 100 can further include an onsite computer (e.g., a terminal, tablet computer, smartphone, etc.), at which an eatery can receive orders. Orders can come, for example, from onsite terminals, kiosks, or other computing devices. Alternatively or additionally, orders can come over a network from computing device connected to the network and located at the eatery or elsewhere. In various examples, the eatery may be able to use the onsite computer to indicate that an order has been filled and is ready for pick-up or delivery. A notification that an order is ready can be sent a patron's computing device and/or to an ordering and/or delivery service.

The preceding examples described various electronic interfaces and devices through which an eatery patron can view the items offered by the eatery, and possibly also order items. In various examples, the menu personalization service 110 can improve on these interfaces by personalizing the list of items according to the preferences of the patron, using user data associated with the patron. For example, the computing device 102 may be a device provided on site by the eatery. In this example, a patron may be able to enter a user identifier into the computing device 102, and the computing device 102 may be able to send a request 104 to the menu personalization service 110 that includes the user identifier. The menu personalization service 110 may then be able to deliver a personalized item list 112 to the computing device 102, which includes a personalized version of the eatery's menu. As another example, the patron may be using the computing device 102 to view the website or app of an eatery, and the website or app may be able to request that the menu personalization service 110 personalize the eatery's menu. In this example, the website or app can then display a personalized version of the menu to the patron. As another example, the patron may be using the computing device 102 to view the offerings of an ordering or delivery service, which may be able to obtain from the menu personalization service 110 personalized item lists for the various eateries that subscribe to the ordering or delivery service. As another example, the menu personalization service 110 may provide an application that can enable a user of the computing device 102 to receive personalized item lists for one or more eateries that may be relevant to the user.

In various examples, the menu personalization service 110 can be implemented as a cloud-based service; that is, as software executing on servers on a network, where the software and servers provide features and functionality (e.g., services) over the network to computing devices on the network. The menu personalization service 110 can include, for example, various software processes for managing user data, generating user data models, generating personalized item lists, and/or generating graphical user interfaces, among other possible processes. The menu personalization service 110 can further include Application Programming Interfaces (APIs) that can enable the software of other application providers to access the data maintained and/or generated by the menu personalization service 110. The menu personalization service 110 can further include an application that can be executed on the computing device 102. Server computers hosting the menu personalization service 110 can be located, for example, in a data center and/or in an enterprise network.

In various examples, the menu personalization service 110 uses machine learning to learn the preferences of a particular user. The data used to train a data model for the user can come from, for example, past item selections made by the user (e.g., an order history associated with the user), a user profile for the user maintained by the menu personalization service 110 or another service, social media data obtained from social media services, the user's application usage behavior (e.g., which sections of an item list did the user spend more or less time looking at; which items did the user select to obtain more details, etc.), and/or responses to questionnaires about eating habits, preferences, and/or dietary restrictions. In various examples, the menu personalization service 110 can obtain the data from data feeds 108 that some eateries may provide. The data feeds 108 may include, for example, a user's order history with an eatery. Alternatively or additionally, the menu personalization service 110 may be able to obtain the data from ordering and/or delivery services. Alternatively or additionally, the menu personalization service 110 may be able to obtain data through an application provided by the menu personalization service 110, through which users can peruse item lists of eateries, indicate items the user prefers or does not prefer (e.g., by selecting "like" or "dislike" icons, a checkbox, or other user interface element), and/or indicate food preferences and/or restrictions.

In various examples, the menu personalization service 110 can apply various machine learning approaches to a user's data to produce a data model. For example, the menu personalization service 110 can use approaches such as decision tree learning, association rule learning, artificial neural networks, inductive logic programming, support vector machines, clustering, Bayesian networks, representation learning, similarity and metric learning, sparse dictionary learning, genetic algorithms, and/or rule-based machine learning, among other examples. In one example, the menu personalization service 110 uses Random Forest Classification, possibly in combination with other machine learning algorithms, in developing data models. As discussed further below, in various examples, the menu personalization service 110 generates a data model for each individual user, and may avoid generating generalized models for types or categories of users.

When training data models, in various examples, the menu personalization service 110 considers multiple factors. For example, the components of each item (e.g., the ingredients listed for the food item) can be used as classifiers or categories for training the data model. In these and other examples, the data model can learn more than, for example, that a user often selects pizza, further that the user frequently selects pizza that includes mushrooms and anchovies as toppings. Considering the components of each item, as well as other factors, enables the data model to include a deeper understanding of the user's preferences. For example, the data model may be able to capture that the person associated with the user data is lactose and gluten intolerant, and thus may prefer pizza without cheese and with a gluten-free crust, as well as a pasta dish that includes non-diary cheese and wheat-free pasta.

In various examples, other attributes can be incorporated into the data models. For example, a method or methods used to prepare an item can also be entered when training a data model. Additionally or alternatively, the menu personalization service 110 can enter an item's course type (e.g., drink, appetizer, entrée, dessert, etc.) and an ethnic or cultural identification, if available. Other attributes that can be included in the training include a time of day, day of week, and/or time of the year when the user selected the item, a type of the eatery from which the item was selected (e.g., a coffee shop, a deli, etc.), whether the item was ordered for consumption at the eatery, for take-out, or for delivery, and/or other factors. In some examples, one or more of these other attributes are considered separately, such as before an item list is input into a data model and/or in refining the output of the data model.

In various examples, once trained, the menu personalization service 110 can use a data model to generate a personalized item list 112 for a user. To generate the personalized item list 112, in various examples, the menu personalization service 110 inputs one or more item lists, which are associated with one or more eateries, into the data model. The data model can then predict which items from the list or lists that the user is most likely to select. The menu personalization service 110 first determines which item lists are most relevant to the user. For example, when the user is sitting in a restaurant and determining what to order, the user will only be interested in the items on the menu in the particular restaurant. As another example, when the user is ordering food for delivery, the user may only be interested in eateries from which food can be delivered within a certain period of time.

To determine which item list or lists may be relevant to a particular user, in various examples, the menu personalization service 110 uses a geolocation 106 and identifies eateries 114 that are at or near the geolocation 106. The menu personalization service 110 can use various techniques to obtain the geolocation. For example, the geolocation may be included in the request 104 received by the menu personalization service 110. The request 104 may include the geolocation 106 when, for example, the computing device 102 is provided by an eatery, the application that generates the request 104 obtains the computing device's geolocation 106 before sending the request 104, and/or because the user has entered the geolocation 106. Alternatively or additionally, upon receiving the request, the menu personalization service 110 can query the computing device 102 to obtain the computing device's geolocation 106. The computing device 102 may be able to indicate the geolocation 106 using a network address, a street address, and/or coordinates that are programmed into the computing device 102. Alternatively of additionally, the computing device 102 may have location tracking components, such as a GPS receiver, that enables the computing device 102 to determine the geolocation 106 (e.g., in the form of a street address, coordinates, or another format).

In some examples, the geolocation that the menu personalization service 110 uses to determine relevant eateries may not be where the computing device 102 is located. For example, a user may be looking for eateries in the vicinity of a location where the user will be later in the day or in a week. As another example, the user may be ordering food for someone else. In these and other examples, the user may be able to enter an address or otherwise specify a geolocation, and the menu personalization service 110 will use this geolocation to determine relevant eateries. As another example, one user may be able to enter the user identifier for a user for whom the first user is ordering. In this example, the menu personalization service 110 may be able to determine the geolocation of the second user; for example, if the second user has an account with the menu personalization service 110, the second user may be able to look up a geolocation of a computing device associated with the second user.

In various examples, the request 104 can indicate whether the menu personalization service 110 is to process the item list of one eatery or multiple eateries. For example, the request 104 can indicate that the user is ordering from a specific eatery, either because the person represented by the user is physically locate at the eatery, or because the user has specified the eatery, or for another reason. As another example, the request 104 can indicate that the user is looking for a place to go to or is ordering for delivery, in which case the user might only be interested in eateries within a certain distance of the geolocation. In these and other examples, the menu personalization service 110 can identify the one eatery the user is interested in, or multiple eateries 114 that are within a certain distance of the geolocation 106. In the latter case, an eatery 116 that is outside the desired area can be ignored.

Having determined relevant eateries 114, the menu personalization service 110 can then retrieve item lists for the eateries 114. In some examples, the menu personalization service 110 may already have an item list for an eatery, stored, for example, in a data store of item lists that the menu personalization service 110 maintains. In this example, the item list may be stored in a structured format, such as eXensible Markup Language (XML), Javascript Object Notation (JSON), or another format, or in an object code format, among other examples. In cases where the menu personalization service 110 does not have an item list for an eatery, or when the menu personalization service 110 determines that the item list for the eatery needs to be updated, the menu personalization service 110 can use various techniques to obtain an item list. For example, an eatery may provide a data feed 108 that services such as the menu personalization service 110 can subscribe to in order to obtain updated information from the eatery. As another example, an eatery may periodically push updated item lists to the menu personalization service 110, such as when the eatery subscribes to the serves of the menu personalization service 110. As another example, an eatery may provide an API that enables the menu personalization service 110 to request an updated item list. As another example, the system 100 may be able to visit the website of an eatery, and parse the parts of the website that display the item list.

The menu personalization service 110 can then input the item lists for the relevant eatery or eateries into the data model for the specific user. The data model can then output, for the items in the list or lists, a probability that the user will select an item. For example, for an item list including spaghetti marinara, baked ziti, and fettucine alfredo, the data model may output a 0% probability that the user will select fettucine alfredo, and 50% probability that the user will select the spaghetti, and a 80% probability that the user will selected the baked ziti. In various examples, the menu personalization service 110 can perform filtering and/or scoring on an item list before inputting the item list into the data model. For example, if the current time is around the middle of the day, the menu personalization service 110 can remove dinner entrees. Alternatively or additionally, the menu personalization service 110 can performing filtering and/or scoring on the output of the data model.

The menu personalization service 110 can use the output of the data model, with or without any pre- or post-processing, to produce the personalized item list 112 that is returned to the computing device 102. The personalized item list 112 can be presented on the computing device 102 in various ways. For example, the item list for an eatery can be modified to add a "Personal Favorites" section, which includes the items that best match the user's preferences. The "Personal Favorites" section can include, for example, the drinks, appetizers, and entrees that the user is most likely to select. As another example, the sections of an item list, such as the appetizers section, the entrée section, the drink section, etc., can be sorted according to the personalized item list 112. As a further example, items that scored lower than a threshold value, can be removed or hidden from presentation to the user. These and other examples can be implemented by the menu personalization service 110 and/or by an application executing on the computing device 102 that is able to the display the personalized item list 112.

In various examples, the information that is presented to the user can be augmented or modified to aid the user in understanding why items were ranked in the personalized item list 112 as they were. For example, specific components and/or descriptions associated with an item can be highlighted, for example by printing the text for these components or descriptions in bold text, underlined text, or highlighted text among other examples. In this example, the components or descriptions may have been a factor that contributed to an item's ranking. As another example, text can be added to an item's display that explains the item's ranking. For example, text can be added that states "You might like this dish because it has some of your favorite ingredients (chicken, almonds, and a flavorful sauce)." In various examples, the menu personalization service 110 can provide modified or additional text that is to be displayed.

In various examples, the information presented to the user can further include a photograph of an item, which may be available from the application that displays the items and/or from the menu personalization service 110. In the latter case, the menu personalization service 110 may be able to obtain a photograph from the data feeds 108 from the eateries 114, from websites of the eateries 114, and/or from social media sites or review sites. Addition of a photo can assist the user in quickly identifying items and/or understanding why an item's ranking in the personalized item list 112.

Figure 2:
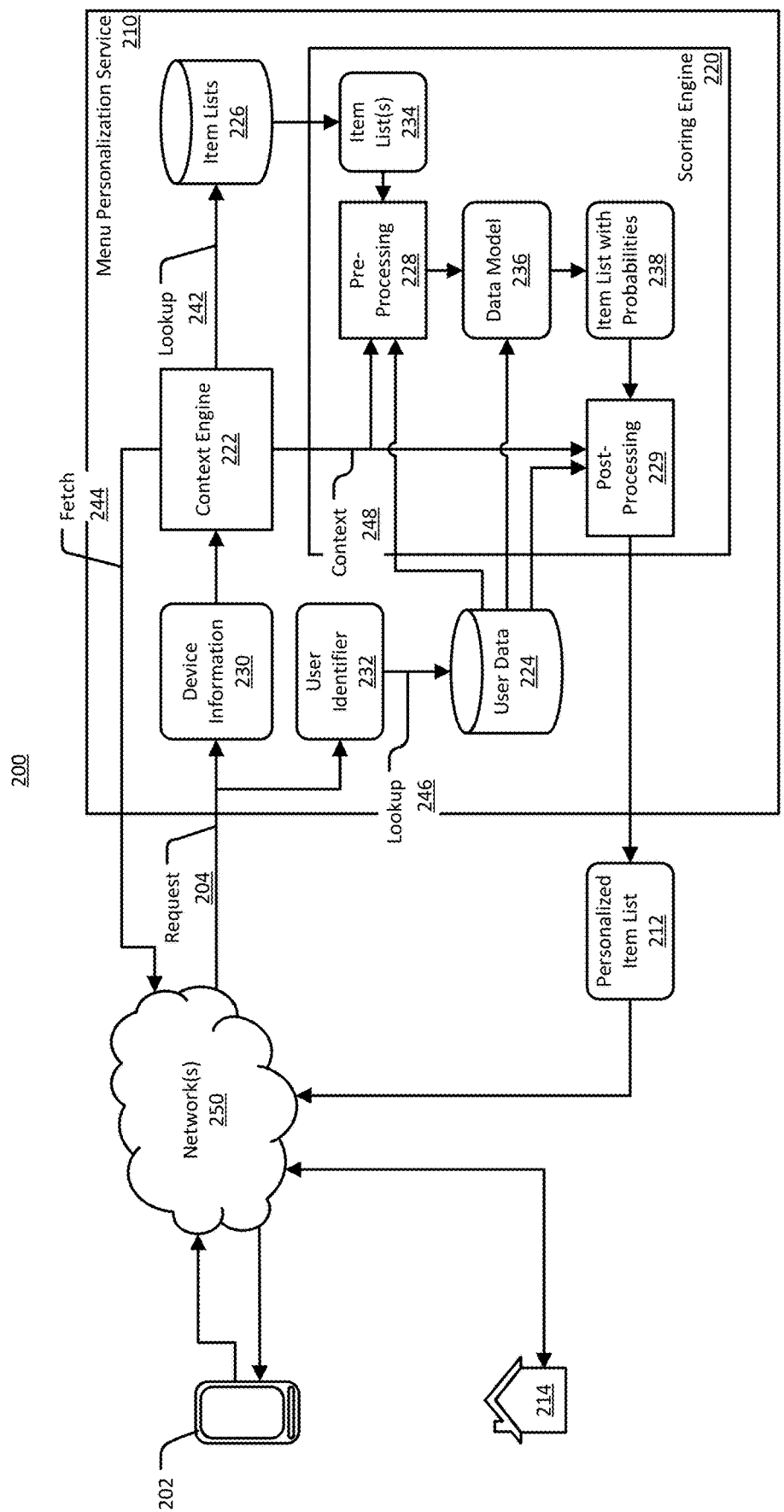
FIG. 2 includes a block diagram illustrating in greater detail components and operations of the menu personalization service.

FIG. 2 includes a block diagram illustrating in greater detail components and operations of the menu personalization service 210 illustrated in FIG. 1. FIG. 2 illustrates a system 200 that includes the menu personalization service 210 and a computing device 202 that is able to communicate with the menu personalization service 210 over a network 250. The network 250 can include one or more private and/or public networks, including the public Internet. In various examples, the computing device 202 can send a request 204 over the network 250 to the menu personalization service 210, and the menu personalization service 210 can respond with a personalized item list 212 that the computing device 202 can receive over the network 250. The personalized item list 212 may include items available from a particular eatery 214 and/or from multiple eateries, with the items being sorted in the personalized item list 212 according to a particular user's preferences. In various examples, the personalized item list 212 can be displayed on the computing device 202 in various ways, as discussed above.

In various examples, the computing device 202 is an end-user device, such as a smart phone, a tablet computer, a laptop computer, another type of mobile device, a desktop computer, a kiosk or console, a gaming console, a media or entertainment center, a computer integrated into a vehicle or household appliance, or another type of computing device. The computing device 202 can be, for example, a personal device, owned by the person who uses the device. Alternatively, the computing device 202 can be a company-owned device, such as a laptop belonging to the employer of the person who uses the computing device 202. As another example, the computing device 202 can be a device owned by or operated by an eatery 214. For example, the computing device 202 can be a kiosk located at the eatery 214, or a tablet computer available for use at the eatery 214.

In some examples, such as when the computing device 202 is a personal device, the computing device 202 may be associated with one or more user accounts. For example, the person who uses the computing device 202 may connect the computing device 202 to one or more email accounts, social media accounts, online data storage accounts, and/or work-related accounts (e.g., to receive work-related email and/or view work-related calendars), among others. These and other accounts enable access to email services, social media services, calendar services, data storage services, gaming services, and other services. In various examples, the computing device 202 may store credentials for one or more of these accounts, and/or may have access over the network 250 to credentials stored with a service provider.

The menu personalization service 210 is an example of a service provider. In various examples, the menu personalization service 210 provides item lists that are personalized for a specific user. The user can, for example, have an account with the menu personalization service 210, which enables the menu personalization service 210 to collect data about the user that can be used to generate the personalized item list 212. Alternatively or additionally, an account with the menu personalization service 210 can enable a user to link other accounts to the menu personalization service 210, such as social media accounts, food ordering or delivery accounts, and/or accounts with other service providers. Linking can be accomplished, for example, using a plug-in provided by the service provider, through an API provided by service provider that gives access to the data of the service provider, or through another mechanism.

In various examples, and as discussed further below, the menu personalization service 210 can use a user account to store data about a user, and can use the data to generate a customized data model for the user. The data model can capture the user's past behavior, and then be used to predict the user's preferences.

Operation of the menu personalization service 210 may be initiated when the menu personalization service 210 receives a request 204 from the computing device 202. The request 204 may be generated by a software application executing on the computing device 202, such as a web browser, an application for viewing the item list of an eatery 214, an application for finding eateries, an application for ordering food items and/or having food items delivered, or another application. An application may, for example, place the request 204 when the application receives user input indicating that the application is to display an item list for a particular eatery 214 or for multiple eateries. In this example, once the menu personalization service 210 has responded with a personalized item list 212, the application can use the personalized item list 212 to generate the display. Alternatively, the application may generate the request 204 in advance of any specific user input that indicates that the application is to display an item list. For example, the application may generate the request 204 when the application determines that the computing device 202 is at a particular place (e.g., the person operating the computing device 202 has stepped off an airplane in a city that is away from home), or that a particular time has been reached (e.g., an hour before lunchtime or dinner time). In these and other examples, the menu personalization service 210, can prepare a personalized item list 212 in advance of the personalized item list 212 being needed on the computing device 202.

In various examples, the request 204 can include various information, such as device information 230 and a user identifier 232. The device information 230 can include information about the hardware and/or software of the computing device 202, such as a device type for the computing device 202 (e.g., mobile phone, tablet, laptop, kiosk, etc.), the device's operating system, the device's Media Access Control (MAC) address, the device's Internet Protocol (IP) address, identification of an Internet Service Provider (ISP) that is currently enabling the computing device 202 to communicate with the network 250, a current network location of the device, and/or a current geophysical location of the device, among other information. In some examples, the device information 230 can further include data provided by an application that may have generated the request 204, including, for example, data identifying the application, identification of a particular eatery 214, identification of multiple eateries, an indication of whether the application is to display an item list for the one eatery 214 or for multiple eateries, if multiple eateries then a locality within which to find the eateries, and/or other information that the menu personalization service 210 can use to derive applicable item lists and/or customize the item lists. In some cases, the request 204 can further include an item list for a particular eatery 214.

The user identifier 232 may also be information provided by the software application. In some examples, the user identifier 232 is one that is associated with a user account of the software application and/or a service provided through the application. For example, the application may be an item ordering service, and the user identifier 232 may be associated with a user account with the ordering service. As another example, the user identifier 232 may be associated with a different service. For example, the user identifier 232 may be a Google® user identifier, an Apple® identifier, or a Facebook® identifier. In this example, the Google®, Apple®, or Facebook® user may be using a Google®, Apple®, or Facebook® credential to access an account with the menu personalization service 210. Alternatively, the user may have linked a Google®, Apple®, or Facebook® account to the menu personalization service 210. As another example, the user identifier 232 may be one that is associated with a user account with the menu personalization service 210. In this example, the software application may have requested that the user enter the user identifier 232 into the application, and/or the application may have stored the user identifier 232 from an earlier request for the user to enter the user identifier 232.

In the illustrated example, menu personalization service 210 inputs the device information 230 into a context engine 222. In various examples, the context engine 222 uses the device information 230 to determine a context 248 for the computing device 202. The context 248 can include, for example, a list of one or more eateries that are relevant to the computing device 202. The context engine 222 may determine that the relevant eateries includes just the one eatery 214 where the computing device 202 is located. For example, the context engine 222 may determine from the device information 230 that the computing device 202 is located at the eatery 214, and, based on this information, that the computing device 202 is to display the item list of the eatery 214. As another example, the context engine 222 may determine that an application executing on the computing device 202 is requesting the item list of the eatery 214, and based on this information (in addition to or instead of the location), that the eatery 214 is relevant.

As another example, the device information 230 may indicate that the application that generated the request 204 is to display the item lists of multiple eateries. For example, the application may indicate that the user is looking for eateries within a certain distance of the computing device's location, within a certain distance of another location, within a certain municipality, and/or within a geographic region that is designated in some other manner. In this example, the context engine 222 may identify eateries within the designated area. Alternatively or additionally, the computing device 202 may supply a list of eateries within the designated area.

In various examples, the context engine 222 may determine other information that may be relevant to the user and/or that may be used in determining relevant item lists and/or to rank or score items. For example, the context engine 222 may determine the current time of day, the day of the week, and/or the current season or time of the year. This information may be used filter or modify results to accommodate the type of meal the user is looking for, a user's changes of preferences at different times of the day, day of the week, or time of the year, and/or to adjust for seasonal availability, among other examples. As another example, the context engine 222 may determine whether the computing device 202 is in a particular location associated with the user (e.g., at "home" or at "work" or at "parent's house" or another location that may have been tagged or labeled by the user). This information can also be used to filter or modify results, and/or to determine a locality to use when identifying relevant eateries.

Having determined relevant eateries, the context engine 222 can initiate a lookup 242 in a data store for item lists 226. In various examples, data store for the item lists 226 stores item lists for various eateries. The item lists can be stored in a structured format, such as a database format, a binary format, in text format such as XML or JSON, or another format that is suitable for storage and retrieval in a large data set. When the data store for the item lists 226 does not include a particular item list, the context engine 222 can initiate a fetch 244 to retrieve the item list from an eatery 214. For example, the eatery 214 may have computing systems that have an API that can handle requests for item lists, or may subscribe to a service through which the eatery 214 can provide an item list. Alternatively, the menu personalization service 210 may be able to parse an item list from a website of the eatery 214. In some cases, the context engine 222 may determine that the data store for the item lists 226 includes an item list of the eatery 214, but that the item list needs to be updated, in which case the context engine 222 will execute a fetch 244 of the item list. Once the item list has been retrieved from the eatery 214 (or from a service that can provide the item list), the context engine 222 can format the item list for storage in the item lists 226 data store, and can add the item list to the data store.

The lookup 242 of the data store for the item lists 226 can result in one or more item lists 234 being produced and input into a scoring engine 220. An item list can include, for example, one or more items available at an eatery, as well as attributes about each item. The attributes can include, for example, components that make up the item (e.g., the ingredients), one or methods used to prepare the items (e.g., cooking methods or food preparation methods), current and/or seasonal availability of the item or item components, dietary or health labels (e.g., "gluten free," "sugar-free," "low-carb," "vegetarian," etc.), and/or a short description of the item, among other possible attributes. In various examples, an item list is organized in a structured format so that the items in the list and an item's attributes can be quickly indexed and retrieved.

In various examples, the scoring engine 220 can also receive the context 248 determined by the context engine 222, and various user data obtained from a data store for user data 224. In various examples, the menu personalization service 210 uses the user identifier 232 to perform a lookup 246 in the data store for user data 224, where various information associated with the user identifier 232 can be stored. The data associated with the user identifier 232 can include a data model 236 and other information. The other information can include attributes associated with the user, such as a list of dietary restrictions, lists of food likes and/or dislikes, and/or past item selections made by the user, among other information. As discussed further below, this information can be used at a pre-processing 228 step and/or a post-processing 229 step in the scoring engine 220.

The pre-processing 228 step, which may be optional, can perform preliminary filtering, sorting, and/or other processing of the item lists 234 retrieved form the item lists 226 data store. The pre-processing 228 step can reduce the number of items in the item lists 234, which can reduce the time required for the data model 236 to process the item lists 234. Pre-processing 228 can include, for example, removing items that do not meet a user's dietary restrictions and/or that are on a list of items marked as disliked. In this example, to identify items to remove, the pre-processing 228 can examine the components of an item. For example, when the user data indicates a gluten intolerance, the pre-processing 228 can look for ingredients such as bread, flour, pasta, and other ingredients that include wheat. The pre-processing 228 can further include, for example, removing item lists for eateries that may not be open at a particular time or may not serve a particular meal (e.g., the eatery only serves lunch or only serves dinner), removing items that include components that are out of season. As a further example, the request 204 may have indicated that the personalized item list 212 is to include only items of a particular type (e.g., only drinks, only appetizers, etc.), in which case the pre-processing 228 can include extracting only items that match the type.

The scoring engine 220 can input the pre-processed item lists (or the item lists 234 that come from the item lists data store 226 when the pre-processing 228 step is not included) into the data model 236 identified by the user identifier 232. As discussed further below the data model 236 can be trained to learn the specific preferences of a particular user. Using this information, the data model 236 can output an item list with probabilities 238; that is, the data model 236 can assign a probability to each item input into the data model 236, where the probability indicates a likelihood that the user will select the item. The probabilities can be computed based on various machine learning techniques, such as Random Forest Classification or neural networks, among other examples. In various examples, the data model 236 considers the components of each item, and possibly also other attributes associated with the item (e.g., a preparation method, a time of the day or day of the week, etc.), in determining a probability. Each item can be independently scored, such that for an example input item list including (A, B, C, D, E), the data model 236 outputs the probabilities A=90%, B=85%, C=50%, D=12%, E=0%, as an example. In some examples, the data model 236 scores items input into the data model 236 relative to one another, so that, for example, the sum of the output probabilities is 100% or 200% or another amount.

In various examples, the scoring engine 220 can include an optional post-processing 229 step, which the scoring engine 220 performs on the item list with probabilities 238. The post-processing 229 can include filtering, scoring, and/ or other adjustments to the item list with probabilities 238. For example, the post-processing 229 step can include removing items that do not meet the user's dietary restrictions, remove items that are on a list of items indicated as disliked, removing items that are not available due to the time of day or the time of year, and so on. As another example, post-processing 229 can include assigning a score to each item in the item list with probabilities 238, with the initial score being based on the probabilities computed by the data model 236. In this example, the post-processing 229 can adjust the scores based on factors such as an item being on a list of the user's favorite items (e.g., increasing the score), the user having expressed a liking for trying new things (e.g., increasing a score for an item having a low probability due to being dissimilar from items previously selected by the user), multiple similar items have a similar score (e.g., the top five items are each pizza, thus reduce the score for each item after the first three, or another threshold), and/or other factors.

The result of the post-processing 229 step (or the item list with probabilities 238, when the post-processing 229 is not included) can be output by the scoring engine 220 as the personalized item list 212. The menu personalization service 210 can send the personalized item list 212 over the network 250 to the computing device 202, for display on the computing device 202.

Figure 3:
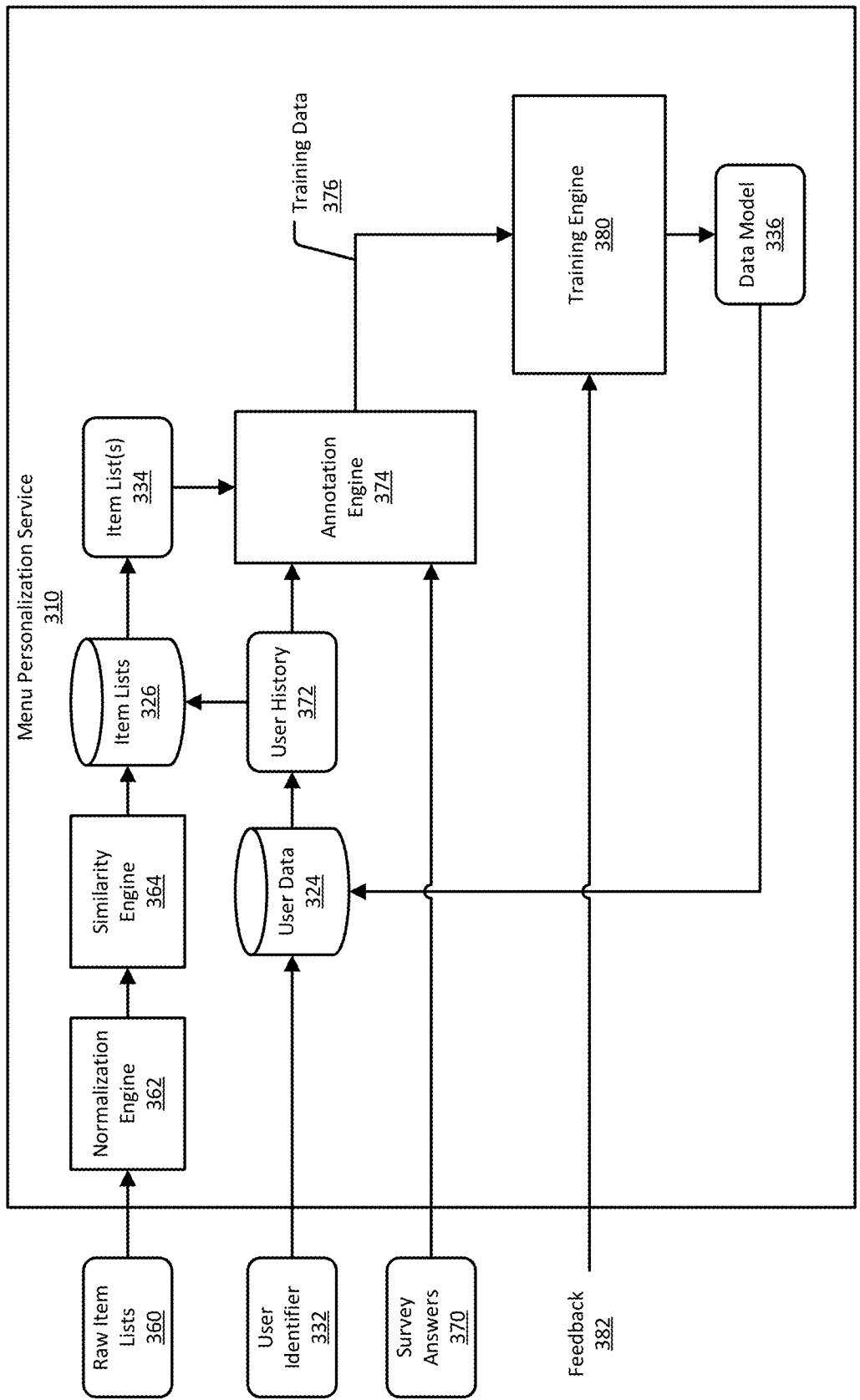
FIG. 3 includes a block diagram illustrating in greater detail components and operations of the menu personalization service.

FIG. 3 includes a block diagram illustrating in greater detail components and operations of the menu personalization service 310 illustrated in FIG. 1. Specifically, FIG. 3 illustrates an example of operations the menu personalization service 310 can perform in generating a data model 336 for a particular user. In various examples, the operations illustrated in FIG. 3 can include processing of raw item lists 360 into a normalized format, so that the item lists from different eateries can be treated similarly. The operations also include development of training data 376 for use in generating the data model 336.

At various times, the menu personalization service 310 can receive raw item lists 360 from eateries, and/or can retrieve the raw item lists 360 from eateries. The menu personalization service 310 can receive a raw item list, for example, when an eatery subscribes to the services of the menu personalization service 310. The menu personalization service 310 may retrieve a raw item list when, for example, an item lists 326 data store of the menu personalization service 310 does not include an item list for a particular eatery, or the menu personalization service 310 determines that the item list for a particular eatery needs to be updated.

The raw item lists 360 may be in various formats, such as plain text, in XML or JSON, in HyperText Markup Language (HTML), in in a binary structure, or in a format dictated by the menu personalization service 310. The menu personalization service 310 can thus include a normalization engine 362 that can read these various formats, and convert the information in a raw item list into a common format, such as JSON. In some examples, format chosen is one that is suitable storing the converted item lists in the item lists 326 data store. In some examples, the format is one that is suitable for inputting into the training engine 380. In various examples, the reformatted item lists attempt to store a common set of information about each item, such as the components of each item, a preparation method or methods for the item, a course type, an ethnic or cultural label, dietary labels (e.g., "vegetarian," "diabetic-friendly," etc.), and/or a human-readable description for the item, among other examples.

Because it is often the case that many words may describe something that is similar or related, the menu personalization service 310 can further include a similarity engine 364 that can identify such words. In various examples, the similarity engine 364 can identify items that have a similarity at a more abstract level. For example, Spaghetti Bolognese, baked ziti, and lasagna are each a type of pasta, and thus may be labeled as such by the similarity engine 364. Alternatively or additionally, the similarity engine 364 can identify components of items that have a wider similarity. For example, ice cream, a grilled cheese sandwich, and a latte each have diary, and, thus, may be labeled as containing dairy by the similarity engine 364. In various examples, the similarity engine 364 can also look for terms such as "wheat-free" and "gluten-free" that have a similar meaning, and can substitute a single, common term. In these and other examples, the similarity engine 364 can produce item lists where similar items from different eateries can have a similar or common description when stored in the item lists 326 data store.

In various examples, the menu personalization service 310 can use the item lists stored in the item lists 326 data store to generate a data model 336 for a particular user. The menu personalization service 310 may generate data model 336 upon receiving a user identifier 332 that identifies the particular user. The menu personalization service 310 may receive the user identifier 332 when the user registers with the menu personalization service 310 as a new user. Alternatively, the user may already have an account that the menu personalization service 310 can access, and the menu personalization service 310 may receive the user identifier 332 when the user subscribes to the services available from the menu personalization service 310. In various examples, the menu personalization service 310 may also receive the user identifier 332 when updating the data model 336 for the user.

In various examples, the menu personalization service 310 can use the user identifier 332 to search a user data 324 data store for a user history 372 for the user. The user history 372 can include past item selections made by the user. For example, the user history 372 can include a user's order history with a particular eatery and/or with an ordering or delivery service. This information may be available because, for example, the user has linked other services (e.g., an account with an ordering or delivery service) to the menu personalization service 310. Alternatively or additionally, the menu personalization service 310 may be part of an ordering or delivery service, and may be able to obtain the data from this other service.

In some examples, the user history 372 can include other information about the user. For example, the user history 372 can include lists of items the user has "liked" or "disliked" (indicated, for example, by a particular value assigned to an item), item lists that the user has viewed previously, and/or previous preference indicators provided by the user, such as dietary restrictions.

In various examples, the menu personalization service 310 can use the user history 372 to search the item lists 326 data store for the item lists 334 that are associated with the data in the user history 372. For example, when the user history 372 includes past item that the user has selected, the menu personalization service 310 can retrieve from the item lists 326 data store the full item list from which the past item was selected. As another example, the user history 372 can include lists of eateries where the user has "checked-in;" that is, the user has indicated that the user has visited the eatery. As another example, when the user history 372 includes an item list that the user viewed in the past, the menu personalization service 310 can retrieve the item list. Obtaining the item lists 334 that correspond to the user history 372 enables the menu personalization service 310 to the user's selection in context. For example, items that the user did not select may be significant because these are items that the user may want to select in the future, or may never select.

In various examples, the menu personalization service 310 can include an annotation engine 374 that examines the item lists 334, and annotates the item lists 334 in view of the user history 372 or other information. The menu personalization service 310 can, for example, mark an item as previously selected or not previously selected. As another example, the annotation engine 374 can attach a tag or value to items marked as "liked" in the user history user history 372, and attach a different tag or value to items marked as "disliked." For item lists that a user has only viewed, possibly without marking likes or dislikes, the user history 372 may indicate for which items the user requested more information (e.g., the user clicked on or rolled over the item, and more detailed information was displayed to the user), and the annotation engine 374 may be able to attach an indicator to these items to indicate the user's interest in the item.

In some cases, the user history 372 may not include much information, or may be non-existent, such as when the user is new to the menu personalization service 310. In these cases, when the user signs up with the menu personalization service 310, the menu personalization service 310 may present the user with one or more surveys to learn some basic information about the user. A survey can ask, for example, demographic questions, such as age, gender, ethnicity, and/or geographic location. As another example, a survey can ask dietary questions, such as if the user is vegetarian, vegan, gluten intolerant, lactose intolerant, diabetic, other food allergies, and so on. A survey can further ask the user to specify the user's favorite type of food or favorite cultural category of food, and/or can ask the user to rank a list of food types. As another example, a survey can ask dietary goals, such as whether the user wants to reduce overall calorie intake, eat more fresh vegetables, reduce sugar intake, and so on In some examples, the survey is short, asking, for example, five or fewer questions, so that the user's engagement is not lost. In some examples, the user may be asked to answer more detailed surveys, which the user can be given the option to decline. In some examples, the menu personalization service 310 may give the user the option to answer survey questions even when the menu personalization service 310 has a user history 372 for the user.

The survey answers 370 can be input into the annotation engine 374, and be used by the annotation engine 374 to annotate the item lists 334. When the user history 372 is unavailable or does not include information sufficient to determine the item lists 334, in various examples, the menu personalization service 310 can determine the item lists 334 from information provided with the survey answers 370. For example, the user may be presented with a survey while using an application for viewing an item list and/or ordering from the item lists of one or more eateries. In this example, the application may provide the item list of an eatery, and/or a geographic location associated with the user and in which the user may be looking for eateries. The annotation engine 374 can further use the survey answers 370 to mark items from the item lists 334 as items the user may or may not be interested in.

The output of the annotation engine 374 can be used as training data 376 for the training engine 380. In various examples, training engine 380 trains a data model 336 to learn the particular user's preferences. In particular, the training engine 380 can use the components of each item to train the data model 336. For example, the training engine 380 can generate a word bag or bag-of-words of an item's components, and use the word bag to train a Random Forest Classification model. As another example, the components can be used as a matrix of features that can be used to train a neural network.

By training the data model 336 on the item components, the data model 336 can gain a more holistic understanding of the user. For example, by examining an item's ingredients, the data model 336 can capture not only that a user likes pizza, but that the user likes pizza with pineapple and ham. As a further example, the data model 336 may be able to capture that the generally likes dishes that incorporate fruit or something sweet. Incorporating the components of each item into the training can enable the data model 336 to assign relevant probabilities even to items that the user has never selected before.

Once trained, the menu personalization service 310 can store the data model 336 in the user data 324, indexed using the user identifier 332.

In some examples, the menu personalization service 310 may receive feedback 382 from or about a user. The feedback 382 can include, for example, item selections made by the user (e.g., data describing an order placed by the user); item lists viewed by the user, possibly including information indicating items about which the user requested additional information; likes and/or dislikes indicated by the user while viewing item lists; likes and/or dislikes the user as the user views a personalized item list generated by the menu personalization service 310; and/or other feedback. In various examples, the menu personalization service 310 can use the feedback 382 to refine and/or retrain the data model 336 to improve the data model 336.

Figure 4:
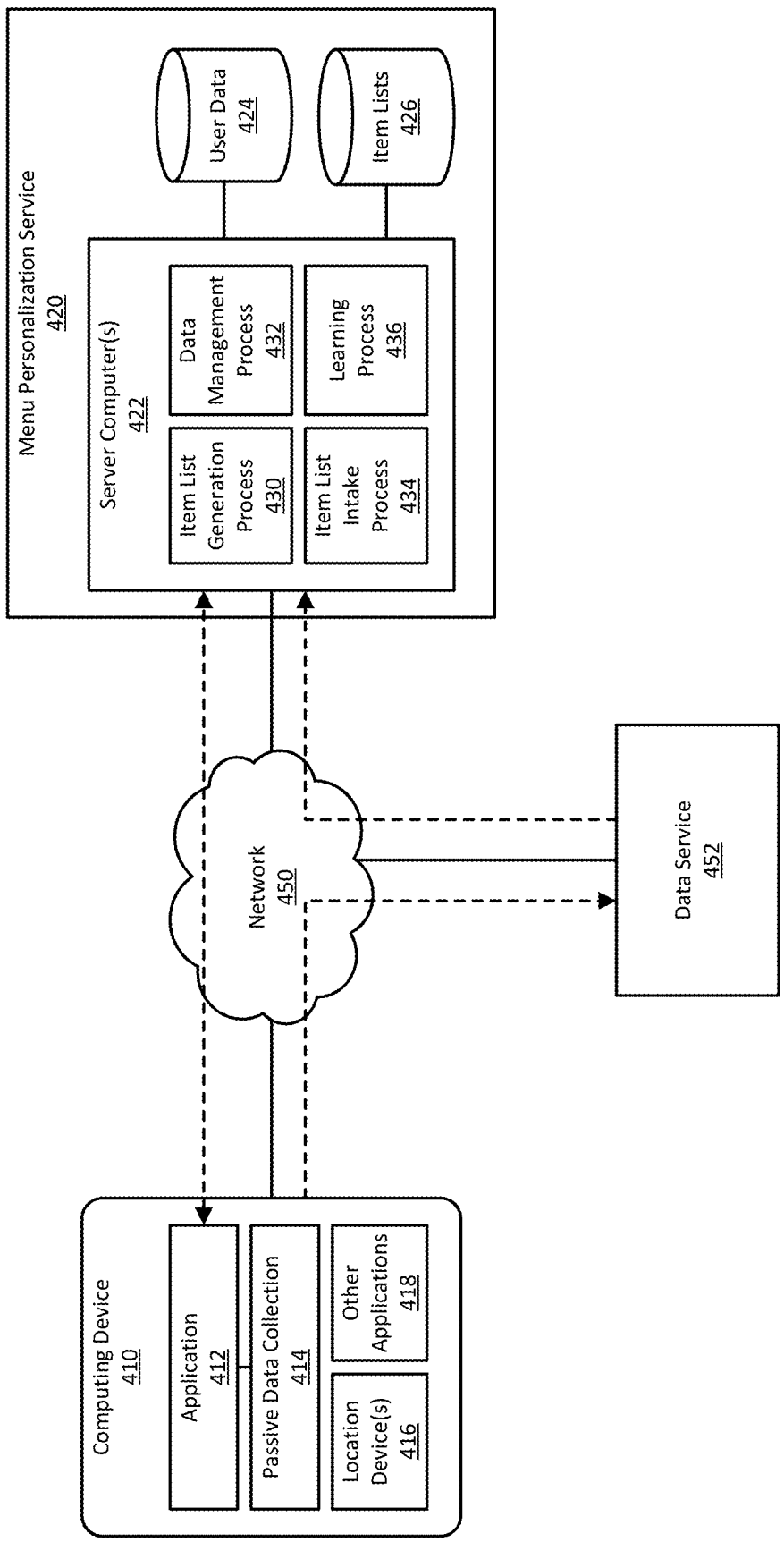
FIG. 4 is a diagram illustrating an example of a menu personalization system.

FIG. 4 is a diagram illustrating an example of a menu personalization system 400, which can be used to generate personalized item lists. In various examples, the menu personalization system 400 includes a menu personalization service 420 that can provide item lists to computing devices, such as a computing device 410 illustrated in the example. In various examples, the menu personalization service 420 can communicate with the computing device 410 over a network 450, which can include private networks and/or public networks such as the Internet. In some examples, the menu personalization service 420 can optionally communicate over the network 450 with a data service 452 that can provide data that the menu personalization service 420 can use to generate personalized item lists.

The computing device 410 of this example can include various types of electronic devices that include a processor (e.g., an integrated circuit device) capable of executing program conde comprising instructions, memory for storing the instructions and/or other data, and network capability, such as a wired or wireless network card and/or a cellular antenna. Examples of such electronic devices include laptop computers, desktop computers, tablet computers, smart phones, personal digital assistants, smart watches, digital eyeglass systems, internet televisions, game consoles, and others.

In various examples, the computing device 410 can include hardware and software that enable the computing device 410 to interact with the menu personalization service 420 and receive item lists. For example, the computing device 410 can include an application 412 through which a user can interact with the menu personalization service 420 to obtain a personalized item list. The application 412 can be provided by the menu personalization service 420. The application 412 can include a graphical user interface that can be output using a display of the computing device 410, and through which a user can enter input. To obtain feedback about the user's interaction with the menu personalization service 420, the application 412 can include a passive data collection 414 component. The passive data collection 414 can record information such as times and dates when the application 412 is launched, the content retrieved from the menu personalization service 420 and output in the application 412, the amount of time the user spends in the application 412, and other information. Additional information can also be collected about the computing device 410, which can be used to change the content delivered through the application 412. For example, the computing device 410 can also include one or more location devices 416 that can determine the computing device's location, and that produce location data. The location data can be used by the menu personalization service 420 for various purposes, such as to determine eateries that may be relevant to the user. In various examples, the computing device 410 may also be able to execute applications 418 through which a user can view item lists.

In various examples, the menu personalization service 420 can be implemented using various software processes executing on or more server computers 422. The software processes can include, for example, an item list generation process 430, a data management process 432, a item list intake process 434, and a learning process 436, among others. The menu personalization service 420 can further include one or more data stores to store data such as user data 424 and item lists 426, among other data. The data stores can be implemented using, for example, hard drives, solid state drives, or another form of non-volatile storage memory.

The server computers 422 on which the processes execute can be computing devices that include one or more processors capable of executing program instructions and memory for storing the program instructions. The server computers 422 and the data stores can, for example, be housed in a data center and/or provided as a service from a data center. Alternatively or additionally, the server computers 422 and the data stores can be housed in a network operated and controlled by the menu personalization service 420 (which may be referred to as an enterprise network).

The item list generation process 430 can be activated when the computing device 410 sends a request to the menu personalization service 420 for a personalized item list. Alternatively or additionally, the computing device 410 may send other information that triggers the menu personalization service 420 to initiate the item list generation process 430. For example, the computing device 410 may indicate that the computing device 410 is in a particular location, that a particular time of day or day of the week has been reached, and/or that the user has activated a particular application, among other examples. In some examples, an application 412 executing on the computing device 410 sends the data that triggers the item list generation process 430. In some examples, the item list generation process 430 may request additional information from the computing device 410, such as a user identifier for the user for which to generate a personalized item list, a current geolocation of the computing device 410, a geolocation for which to generate the item list, or other information.

The item list generation process 430 can generate and output a personalized item list for a particular user, as discussed above. To generate the personalized item list, the item list generation process 430 can use data associated with the particular user, retrieved form the user data 424 data store using a user identifier. The user data can include a data model that is specific to the user, as well as other information about the user. Using the data model and possibly also the other information, the item list generation process 430 can generate a personalized item list for the user. The menu personalization service 420 can send the personalized item list to the computing device 410 for display in an application 412. The menu personalization service 420 can also, alternatively or additionally, store the personalized item list in the user data 424 data store, for sending to the computing device 410 at a later time.

The menu personalization service 420 can use the item list intake process 434 to process item lists from eateries. The item list intake process 434 may be launched at various times, such as when an eatery registers with the menu personalization service 420, when the computing device 410 reaches a location where a new eatery or eateries can be found, the application 412 is used to view the item list of a new eatery, and/or at other times. In various examples, the menu personalization service 420 can obtain an item list from a data service 452. In some examples, the data service 452 is a computer managed by an eatery, and on which the eatery may manage digital communication of the items provided by the eatery. In some examples, the data service 452 is a web server on which the item list of an eatery can be viewed. In some examples, the data service 452 is an item list aggregator, such as an eatery review site or an ordering and/or delivery service, among other examples.

As discussed above, the item list intake process 434 can process an item list to determine the components of each item and other attributes about the item. The item list intake process 434 can further format the information in an item list into a common format, and store the information in an item lists 426 data store.

The menu personalization service 420 can use the learning process 436 to learn the preferences of each user. The learning process 436 can be launched when, for example, a user subscribes to the services of the menu personalization service 420, or at later times when the menu personalization service 420 obtains new information about a user. As discussed above, the learning process 436 can train a data model for a particular user, using a user's past item selections, answers to survey questions, application usage history, likes and/or dislikes, check-ins, and other data. The menu personalization service 420 can store the data model in the user data 424 data store, along with other information about the user.

The data management process 432 can coordinate the large volumes of data that the menu personalization service 420 may generate and/or use. The data can include, for example, item lists for hundreds of thousands of eateries around the world. The menu personalization service 420 maintains a data model for each individual user, thus the data can also include hundreds of thousands (or more) individual data models. Operations of the data management process 432 can include, for example, identifying eateries for which the item lists 426 data store does not have any data, determining that an item list in the item lists 426 needs to be updated, and/or purging out of date item lists or item lists for eateries that no longer exist. In some examples, the menu personalization service 420 can perform these and other operations periodically, such as once a week. Alternatively or additionally, the data management process 432 can initiate these operations based on data from the computing device 410 or other computing devices, such as when the computing device 410 reaches a geolocation for which the menu personalization service 420 does not have any eatery information, or the computing device 410 sends a request for a personalized item list.

In various examples, the data management process 432 may handle the learning process 436 in a similar fashion. For example, the data management process 432 may launch the learning process 436 when a user first subscribes to the menu personalization service 420. Additionally, the data management process 432 may launch the learning process 436 periodically to update the data model for a user. Alternatively or additionally, the data management process 432 may launch the learning process 436 when the menu personalization service 420 receives new or updated data about a user.

Operations of the data management process 432 can further include determining whether and when to initiate the item list generation process 430. In some examples, the data management process 432 may launch the item list generation process 430 ahead of when a personalized item list may be needed. For example, the data management process 432 may launch the item list generation process 430 when, for a particular user, a certain time of the day or day of the week is reached, so that a personalized item list can be generated for the user in advance of the user wanting to see the list. For example, the data management process 432 may launch the item list generation process 430 an hour before the user's usual lunch time or dinner time. As another example, the data management process 432 may launch the item list generation process 430 when the computing device 410 reaches a certain location. For example, the data management process 432 may determine that the computing device 410 is in a new geolocation (e.g., because the computing device's owner is traveling), and may launch the item list generation process 430 in case the user is going to look for something to eat in the new location. In various examples, the menu personalization service 420 may use a combination of location, time, and other factors to initiate the item list generation process 430. Personalized item lists generated in advance can be stored in the user data 424 data store. In some examples, the data management process 432 may launch the item list generation process 430 upon the menu personalization service 420 receiving an explicit request from the computing device 410.

Figure 5:
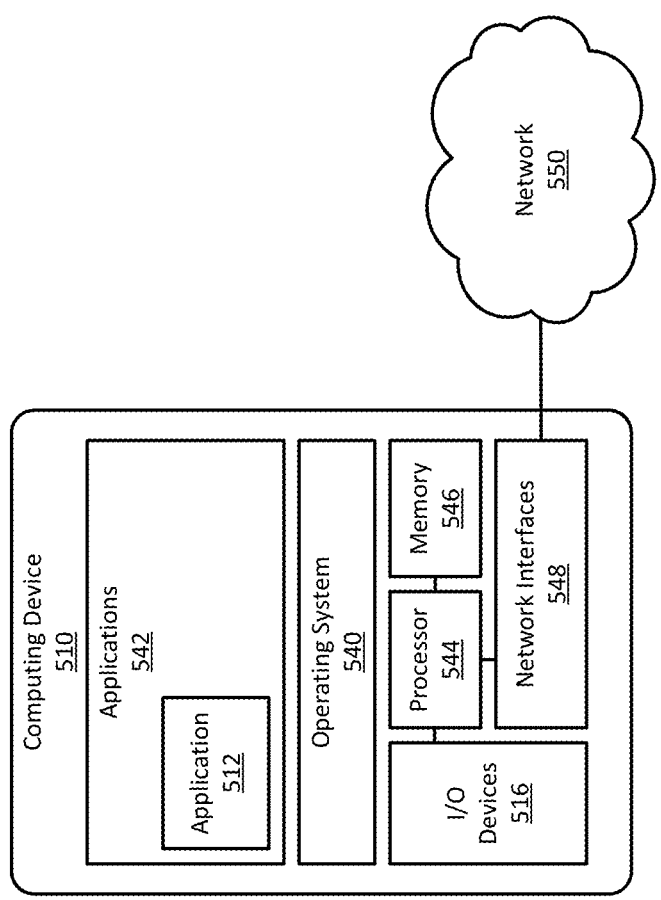
FIG. 5 includes a block diagram illustrating an example of a computing device.

FIG. 5 includes a block diagram illustrating an example of a computing device 510, such as the computing device illustrated in FIG. 4 The example computing device 510 of FIG. 5 can include various software components and software components, which can be used in various combinations to present content to a user of the computing device 510. The content can include personalized item lists generated by a menu personalization service.

In various examples, the software components can include an operating system 540 and applications 542. The operating system 540 can manage the various operations of the computing device 510, including the applications 542 executing on the computing device 510 and the computing device's hardware. The applications 542 can include programs accessible to a user of the computing device 510, including a delivery application 512, through which the user can interact with the menu personalization service.

In various examples, the hardware components can include a processor 544, memory 546, Input/Output (I/O) devices 516, and network interfaces 548, among other components. The processor 544 can be an integrated circuit device that is operable to execute program instructions, including the instructions for executing the operating system 540 and the applications 542. The memory 546 can store the program instructions while the processor 544 is executing the instructions, and/or while the computing device 510 is powered off. In various examples, the computing device 510 can include multiple memories, including volatile and/or non-volatile memories. Non-volatile memories can also be described as non-transitory. The I/O devices 516 can include user input and output devices, such as display screens, touch screens, keyboards, mice, and so on. The I/O devices 516 can further include location devices, such as a Global Positioning System (GPS) receiver. The network interfaces 548 can include wired and/or wireless network devices, such as a network port, a Wi-Fi antenna, and/or cellular antennas, among other examples. The network interfaces 548 can enable the computing device 510 to communicate with a network 550, including, for example, the Internet.

Figure 6:
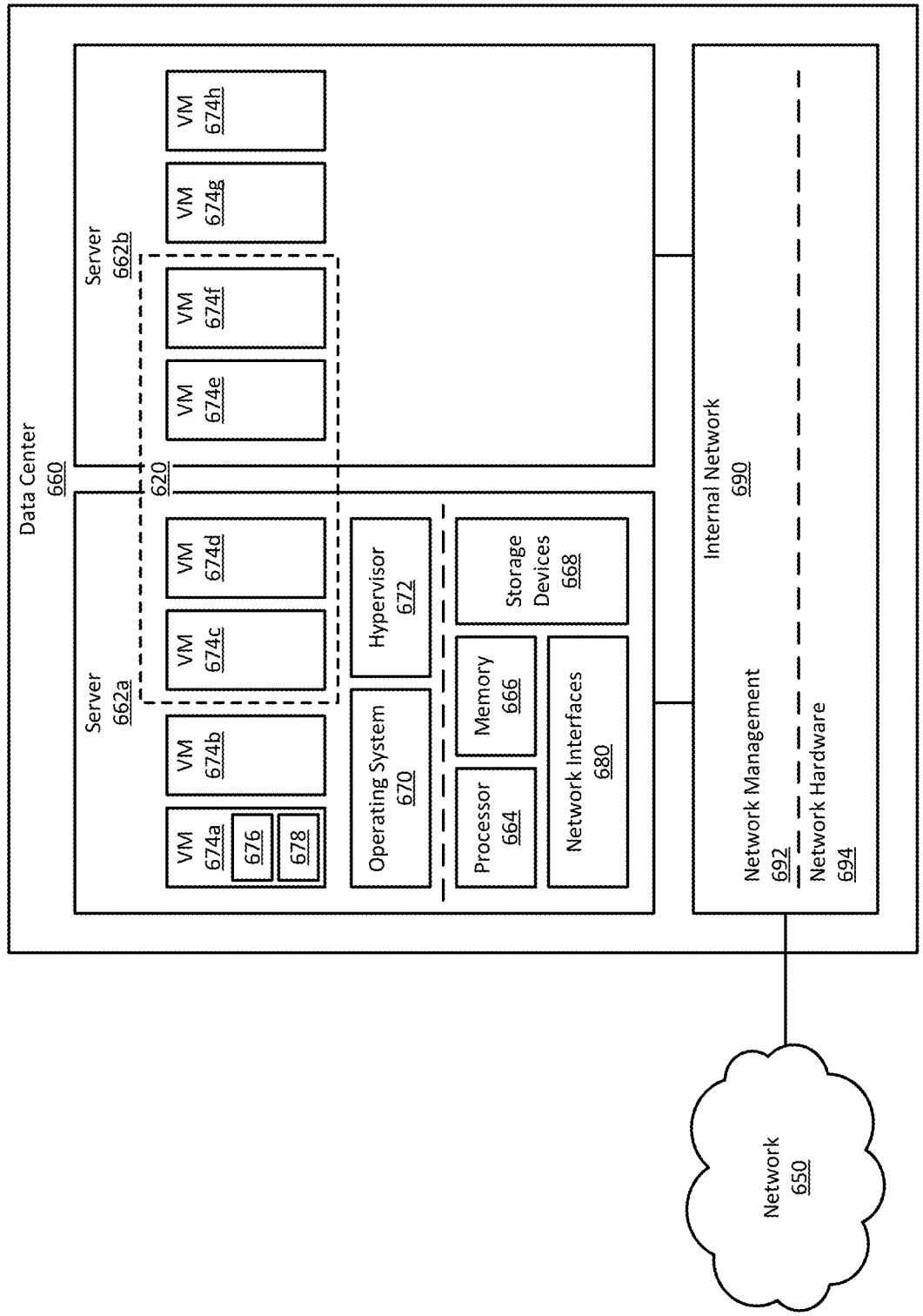
FIG. 6 includes a block diagram illustrating an example of a data center.

FIG. 6 includes a block diagram illustrating an example of a data center 660, which can host a menu personalization service 620, such as the menu personalization service illustrated in FIG. 4. The data center 660 can be operated by an entity other that the entity that controls the menu personalization service 620, and may be leasing resources to the operator of the menu personalization service 620. Alternatively, the data center 660 may be operated by the entity that controls the menu personalization service 620.

The data center 660 can include multiple servers 662a-662b, of which two are illustrated here. A server can be a computing device configured primarily for being accessed over a network, and possibly for simultaneous use by multiple, unrelated users. An example of a configuration of a server is illustrated by a first server 662a in FIG. 6. As illustrated by the first server 662a, a server can include a software layer and a hardware layer.

The software layer can include, for example, an operating system 670 a hypervisor 672, and virtual machines 674a-674d, among other software and applications. The operating system 670 can control and coordinate the operations of the first server 662a, including execution of the hypervisor 672, the virtual machines 674a-674d, and operation of the hardware. The hypervisor 672, which can also be referred to as a kernel-based virtual machine (KVM) or a virtual machine monitor (VMM), can manage the virtual machines 674a-674d. For example, the hypervisor 672 can handle operations such as bringing up new virtual machines, use of the virtual machines of the first server's hardware, and taking down virtual machines, among other operations. In some examples, the hypervisor 672 is integrated into the operating system 670.

A virtual machine is an emulated computer system running on the hardware of a physical computer system. As illustrated by a first virtual machine 674a, a virtual machine can include a virtual representation of computer hardware 678, which may but need not map to the physical hardware of the computing system on which the virtual machine is running. The virtual machine can further include software 676 that is running on top of the virtual hardware 678. The software 676 can include an operating system and applications that are separate and distinct from the operating system 670 and applications of the first server 662a. As with physical computing systems, virtual machines can be isolated from one another, and a user operating within one virtual machine may be unaware of the existence of other virtual machines on the same system. The virtual machines 674a-674h illustrated in FIG. 6 can each have a similar configuration as is illustrated for the first virtual machine 674a, with variations in the software executed and/or the particular configuration of the virtual hardware.

The hardware layer of the example first server 662a can include a processor 664, memory 666, storage devices 668, and a network interface 680, among other hardware. The processor 664 is an integrated circuit device operable to execute program instructions, including the instructions for the programs executing in the software layer of the first server 662a. In some examples, the first server 662a can include multiple processors. In some examples, a processor can include multiple processing cores. While the processor 664 is executing program instructions, the program instructions can be stored in the memory 666. In various examples, the memory 666 can be volatile memory and/or non-volatile memory. In various examples, the first server 662*a* can include multiple different memories. The storage devices 668 can include non-volatile storage systems, such as hard drives, flash drives, and/or solid state drives, among other examples. While not being executed, and, in some cases, while being executed, program instructions can be stored on the storage devices 668. The memory 666 and the storage devices 668 illustrate two examples of non-transitory computer-readable mediums. The network interfaces 680 can include hardware and software for connecting the first server 662*a* to a network, such as the internal network 690 of the data center 660. In some examples, the first server 662*a* can include multiple network interfaces 680 so that the first server 662*a* can maintain multiple connections to the internal network 690.

In various examples, other servers in the data center 660, such as a second server 662*b*, can be configured similarly to the first server 662*a*, possibly with variations in the software being executed, the number of virtual machines running at any given time, and/or variations in the hardware included in the server.

The internal network 690 of the data center 660 can connect the servers 662*a*-662*b* of the data center 660 to each other and to external networks 650, such as the Internet. The internal network 690 can include network management 692 software, which can perform operations such as balancing the workload on each of the servers 662*a*-662*b*, bringing up and taking down servers, and/or assigning the data center's customers to servers and/or virtual machines on the servers, among other operations. The internal network 690 can further include network hardware 694, such as the routers, switches, hubs, and gateways that form the internal network 690.

A customer of the data center 660 can include the menu personalization service 620. The menu personalization service 620 can, for example, be assigned one or more virtual machines in the data center 660, which the menu personalization service 620 can use for executing the various processes of the menu personalization service 620. The data center 660 can be configured such that the operator of the menu personalization service 620 need not know where the virtual machines assigned to the menu personalization service 620 are executing. In the example of FIG. 6, the menu personalization service 620 has been assigned several virtual machines executing on the first server 662*a* and several executing on the second server 662*b*. In various examples, the data center 660 may determine to move the menu personalization service 620 to different servers, and may thus migrate the operations of the menu personalization service 620 from one virtual machine to another.

In various examples, the operator of the menu personalization service 620 can access the virtual machines assigned to the menu personalization service 620 from the network 650. For example, the data center 660 can provide a console or graphical user interface through which the operator can configure the virtual machines. In various examples, the data of the menu personalization service 620 can be stored on the storage devices 668 of the servers, and/or on network attached storage devices in the data center 660.

The services of the menu personalization service 620 can further be provided over the network 650 to users. For example, the virtual machines assigned to the menu personalization service 620 can each include a virtual network interface, through which the virtual machines can communicate with the network 650. Communications can include receiving input from user devices and/or transmitting content to the user devices.

Figure 7A:
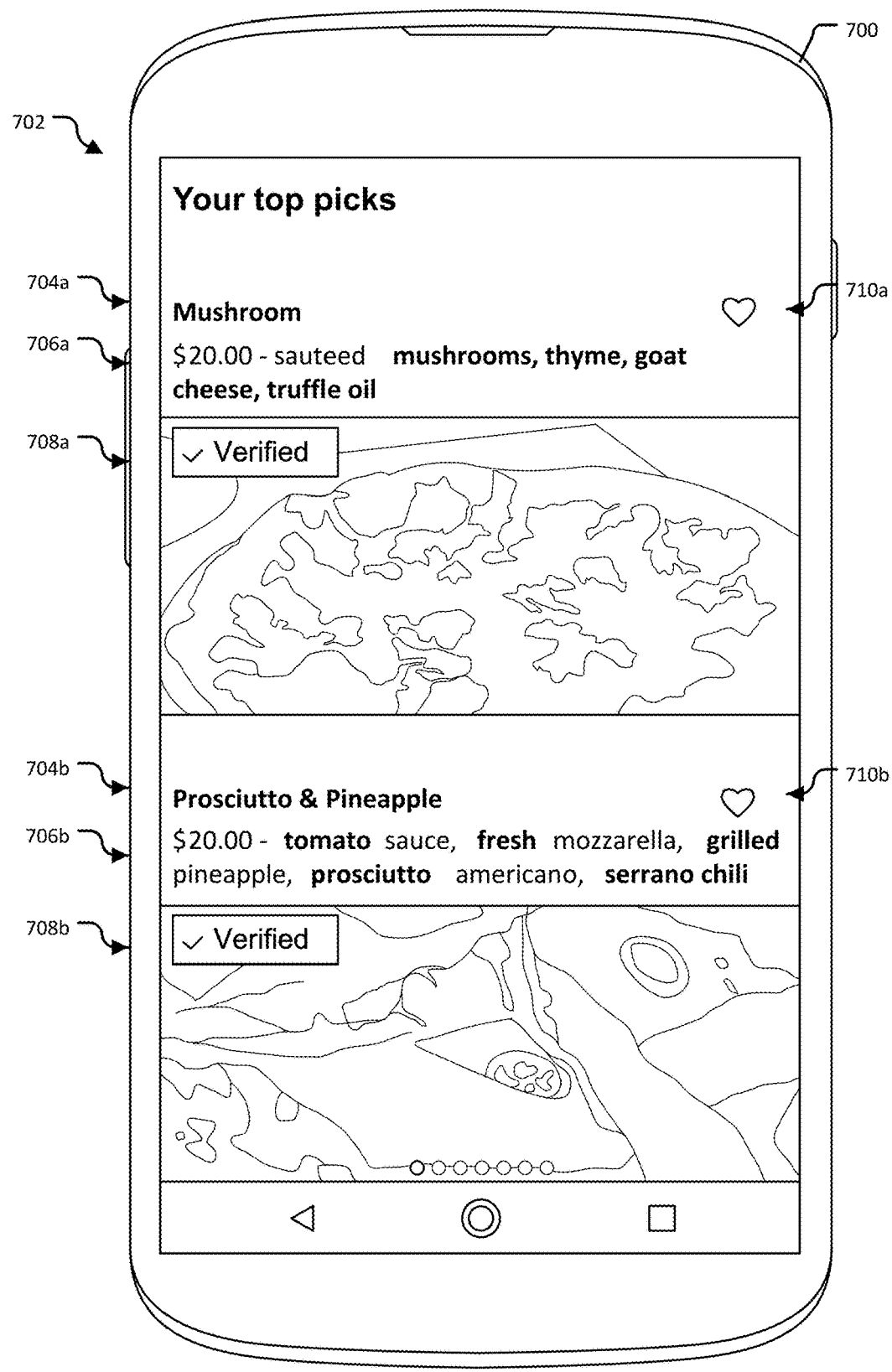
FIGS. 7A-7C include illustrations of user interfaces that can be used to present a personalized item list.
Figure 7B:
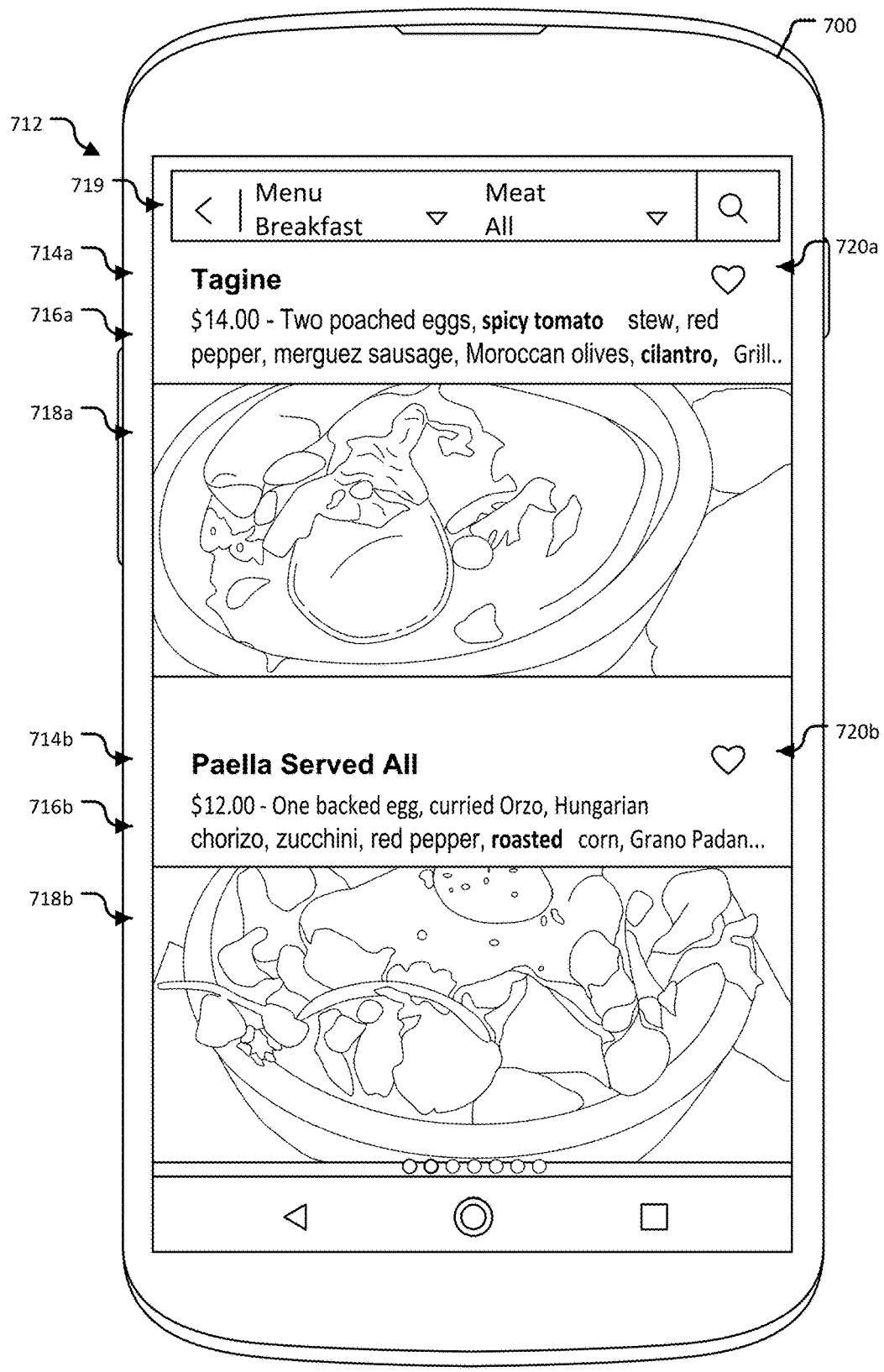
Figure 7C:
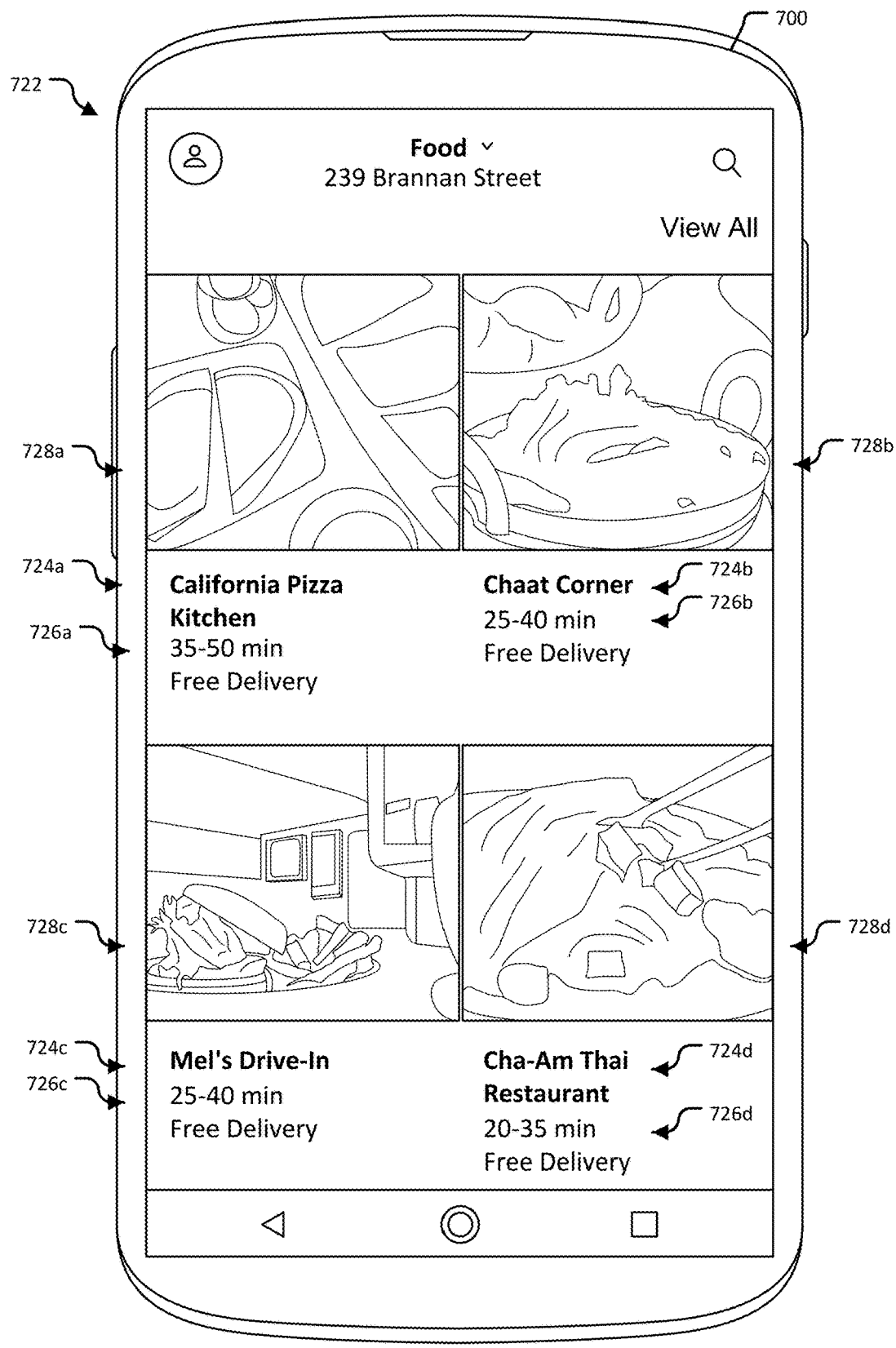

FIGS. 7A-7C include illustrations of user interfaces that can be used to present a personalized item list, generated as described, for example, with respect to FIG. 2, on a computing device. In the example of FIGS. 7A-7C, user interfaces for a smartphone 700 are illustrated. Similar interfaces can be used on other computing devices, such as tablet computers, laptops computers, and so on.

FIG. 7A illustrates an example of a user interface 702 that includes a separate section for displaying the items in a personalized item list 212. The separate section can be labeled "Your top picks" or "Personal Favorites," or something similar. The separate section enables a user to view only the items in the personalized item list 212, so that the user need to search for these items across different sections of the overall item list for an eatery.

In the example of FIG. 7A, two items are displayed in the user interface 702. Additional items may be viewable by scrolling up or down or sideways. Each item includes a title 704*a*-704*b*, a short description 706*a*-706*b*, and a photograph 708*a*-708*b* of the item. In this example, the short description 706*a*-706*b* includes a price and a list of ingredients for the item. The photograph 708*a*-708*b* may be provided to enable faster identification of the item. The user interface 702 further include an icon 710*a*-710*b*, here in the shape of a heart, that the user can use to indicate that the user prefers the item and/or wants to add the item to a list of favorite items. As discussed above, selection of the icon 710*a*-710*b* can be used to indicate a user's preference even when the user does not ultimately select the item.

FIG. 7B illustrates an example of a user interface 702 that has been modified with information provided by a personalized item list. Two items are illustrated in this example, and more items may be viewable by scrolling up or down or sideways. The items, in this case, have been selected using a filters activated from drop down lists 719. Each item includes a title 714*a*-714*b*, a short description 716*a*-716*b*, a photograph 718*a*-718*b*, and an icon 720*a*-720 that the user can use to "favorite" the item.

In some cases, the person viewing the items may not be familiar with the items, and may need assistance in deciding whether to select the items. In the example of FIG. 7B, components of the items have been highlighted, in this case by printing the text for these components in bold. The components were highlighted because the personalized item list for the user indicated that the user might select the item based on the item having these particular components. Indicating why a user might enjoy the item can aid the user in determining whether to select the item. In other examples, text can be added to the description 716*a*-716*b* that provides an explanation as to why the user might select the item, such as "Recommended for you because you like spicy tomato and cilantro."

FIG. 7C illustrates an example of a user interface 722 that displays eateries and information associated with the eateries. In this example, four eateries are displayed, with more possibly being viewable by scrolling vertically or horizontally. The display for each eatery includes the name 724*a*-724*d*, a short description 726*a*-726*d* for each eatery, and a photograph 728*a*-728*d* for each eatery. The short description 726*a*-726*d*, in this example, includes an approximate delivery time and delivery fee. The user interface 722 of this example may be displayed when, for example, the user requests a list of nearby eateries, a list of eateries in a certain locality, and/or a list of eateries that deliver, among other examples.

In the example of FIG. 7C, the displays for the eateries have been modified using information from a personalized item list. Specifically, the photograph 728*a*-728*d* that might otherwise be displayed has been replaced with a photograph of an item from the personalized item list 212. The item lists for each of the four eateries may have been input into the menu personalization service, and the menu personalization service 210 can have determined, for each eatery, the items most likely to be selected by the user. The top item for each eatery may then have been selected for display. This customization of the user interface 722 for the particular user can assist the use in more quickly determining which eatery to investigate further.

Figure 8:
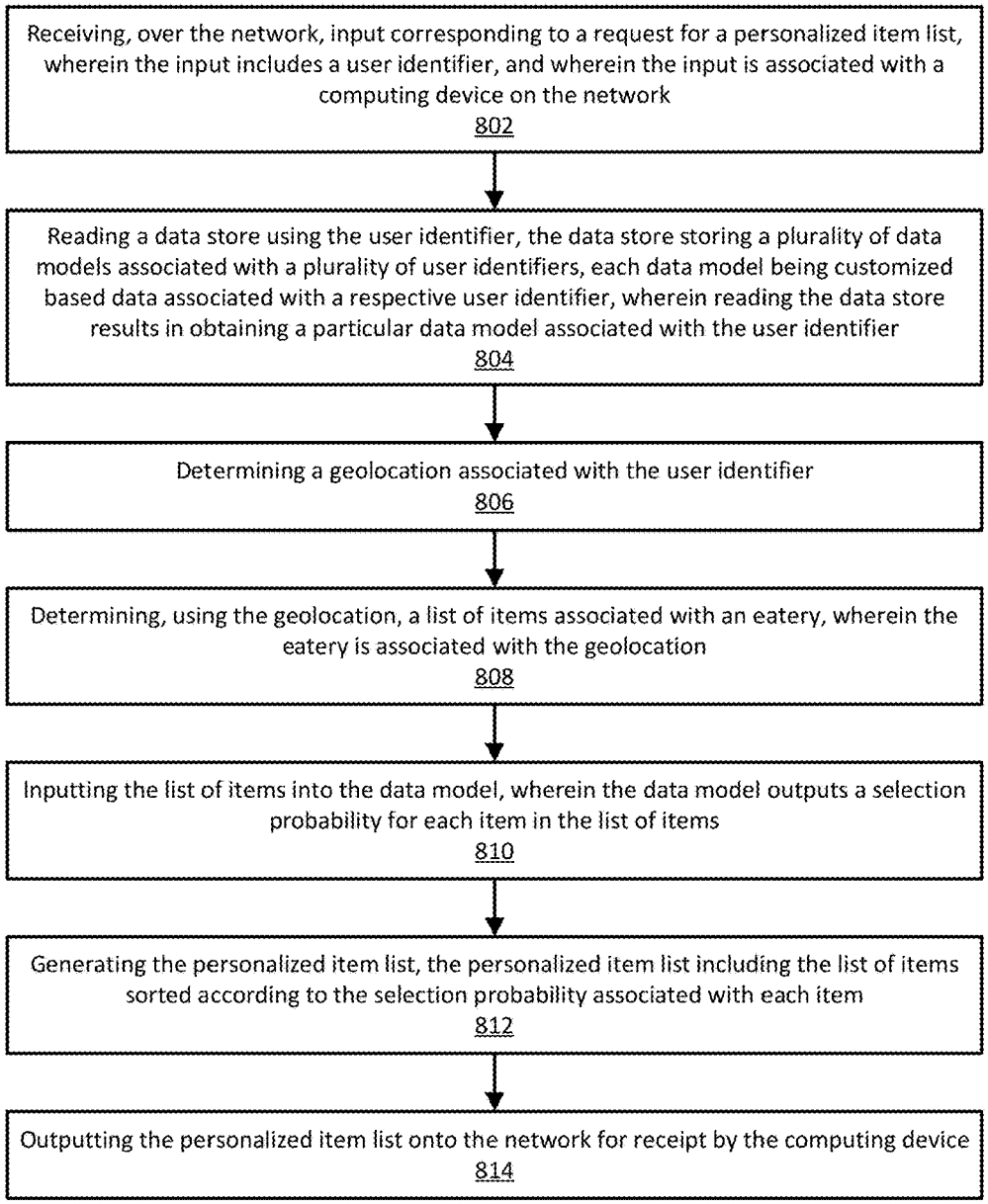
FIG. 8 includes a flowchart illustrating an example of a process for generating a personalized item list.

FIG. 8 includes a flowchart illustrating an example of a process 800 for generating a personalized item list. The example process 800 can be implemented by a server computer on a network, which can include one or more processors and a non-transitory computer readable medium including instructions. The instructions can, alternatively or additionally, be part of a computer-program product tangibly embodied in a non-transitory machine-readable storage medium. The instructions, when executed by one or more processors, can cause the one or more processors to perform the steps of the process 800 illustrated in FIG. 8.

At step 802, the process 800 includes receiving, over the network, input corresponding to a request for a personalized item list, wherein the input includes a user identifier, and wherein the input is associated with a computing device on the network. The input may have been generated by an application executing on the computing device. The application may be, for example, for viewing item lists of one or more eateries, for seeing reviews of eateries, and/or for ordering from eateries. In some examples, the user identifier is associated with a user account with a menu personalization service. In some examples, the user identifier is associated with a service that is linked to the menu personalization service.

At step 804, the process 800 includes reading a data store using the user identifier, the data store storing a plurality of data models associated with a plurality of user identifiers, each data model being customized based data associated with a respective user identifier, wherein reading the data store results in obtaining a particular data model associated with the user identifier. In various examples, each of the plurality of data models is trained using a machine learning method.

At step 806, the process 800 includes determining a geolocation associated with the user identifier. In some examples, the geolocation may be obtained from the computer device. In some examples, the geolocation is provided with the input received at step 802. In these examples, the geolocation may be different from the location of the computing device. In some examples, the geolocation includes a specific location (e.g., a specific address or coordinates). in some examples, the geolocation includes an area, such as a radius from a specific location, a neighborhood, a town or city, or an area designated in another manner.

At step 808, the process 800 includes determining, using the geolocation, a list of items associated with an eatery, wherein the eatery is associated with the geolocation. In some examples, the item list is associated with an eatery at the geolocation. In some examples, the item list is associated with an eatery within a pre-determined distance from the geolocation.

At step 810, the process 800 includes inputting the list of items into the data model, wherein the data model outputs a selection probability for each item in the list of items. In some examples, the list of items includes a listing of components included in each item. In these examples, the selection probabilities are based at least partially on the listing of components.

In some examples, the process 800 can further include associating numerical scores with each item in the personalized item list. The numerical scores can be based on, for example, the probabilities generated at step 810. In these examples, the process 800 can further include resorting the personalized item list according to the numerical scores. In some examples, the process 800 can include determining a current time, and modifying the numerical scores according to the current time. In some examples, the process 800 can include determining a recent item selection associated with the user identifier, wherein the recent item selection is determined from within a pre-determined time period preceding receipt of the input. For example, the process 800 can include determining items that the user selected in the previous day or the previous week. In these and other examples, the process 80 can include modifying the numerical scores according to the recent item selection. For example, scores for items that a user selected recently may be reduced. Alternatively, when the user has indicated a preference for selecting the same item repeatedly, the scores for the items may be increased. In some examples, the process 800 further includes reducing numerical scores for successive similar items in the personalized item list. For example, more than a threshold number of similar items are in the personalized item list, the score for items exceeding the threshold may be reduced.

At step 812, the process 800 includes generating the personalized item list, the personalized item list including the list of items sorted according to the selection probability associated with each item.

At step 814, the process 800 includes outputting the personalized item list onto the network for receipt by the computing device. Upon receipt, the computing device can use the personalized item list to generate a display of items, or to modify an existing item display.

In some examples, determining the geolocation and generating the personalized item list occurs at a point in time prior to receiving the input, such that receiving the input results in outputting of the personalized item list. For example, the process 800 can include receiving input indicating that the computing device has reached a particular location and/or a certain time (e.g., time of day or day of the week, etc.). In this example, upon receiving the input, the process 800 can initiate determination of the geolocation and generating of the personalized item list.

In various examples, the process 800 can further include receiving input corresponding to an item selection, and adding the item selection to the data model. In these examples, the data model is updated when the user selects an item (e.g., by placing an order for the item, by viewing details about the item, by indicating a preference for the item, and so on). In some examples, the process 800 can further include receiving input corresponding to a value associated with an item from the personalized item list, wherein the value is a positive value or a negative value, and adding the value to the data model. The positive value can indicate, for example, that the user has a preference for the item, while the negative value can indicate that the user is not likely to select the item.

FIG. 9 includes a flowchart illustrating an example of a process 900 for training a data model that can be used to generate a personalized list. The example process 900 can be implemented by a server computer on a network, which can include one or more processors and a non-transitory computer readable medium including instructions. The instructions can, alternatively or additionally, be part of a computer-program product tangibly embodied in a non-transitory machine-readable storage medium. The instructions, when executed by one or more processors, can cause the one or more processors to perform the steps of the process 900 illustrated in FIG. 9.

At step 902, the process 900 includes retrieving, from a data store, data associated with a user identifier, the data store storing past item selections associated with a plurality of user identifiers, wherein each item is associated with an eatery. Each item may further be associated with a set of attributes, the set of attributes including whether a respective item was selected or not selected. The data that is retrieved includes particular past item selections associated with the user identifier.

In various examples, the set of attributes can include various other information about an item. For example, the set of attributes further includes a list of components comprising the respective item (e.g., the item's ingredients). As another example, the set of attributes further can include a menu item type (e.g., drink, appetizer, entrée, dessert, etc.). As another example, the set of attributes can include a preparation description (e.g., a cooking method, an ethnic or cultural identifier, etc.). As another example, the set of attributes can include point in time when the respective item was selected, which may correlate to a meal type (e.g., breakfast, lunch, dinner, etc.), a holiday (e.g., Thanksgiving, Christmas, etc.), or another occasion. As another example, the set of attributes can include a value having a positive value or a negative value, wherein the positive value indicates positive probability that the respective item would be selected, and wherein the negative value indicates a negative probability that the respective item would be selected. In this example, the positive value can be associated with the user "liking" the item and the negative value can be associated with the user "disliking" the item. In some examples, an attribute associated with a particular item from the particular past item selections indicates that the particular item was selected, wherein the particular item was selected from a list of items associated with an eatery.

At step 904, the process 900 includes training a data model using the data, wherein the set of attributes associated with each particular past item selection provides categories for classification by the data model, and wherein, when trained, the data model outputs a personalized item list, the personalized item list predicting for a list of items probabilities that each item from the list of items will be selected. The data model can be trained using various machine learning techniques, such as Random Forest Classification or neural networks, among other examples.

At step 906, the process 900 includes receiving, over the network, input corresponding to a particular list of items, wherein the request is associated with the user identifier. The input may be the item list of a particular eatery or of multiple eateries. The input may be received as a result of an application executing on a computing receiving input indicating that the application is to display the list of items.

At step 908, the process 900 includes inputting the particular list of items into the data model to determine a particular personalized item list. In some examples, the output of the data model may undergo additional processing, such as filtering, sorting, and/or categorizing.

At step 910, the process 900 includes outputting the particular personalized item list onto the network, for receipt by a computing device. Upon receipt, the computing device can display the personalized item list, or use the information provided by the personalized item list to generate or modify a display.

In some examples, the process 900 can further include receiving additional input corresponding to a particular item selected from the personalized item list. The input can indicate, for example, that the user has ordered the particular item. In these examples, the process 900 can further include determining a particular set of attributes associated with the particular item, and training the data model with the particular item and the particular set of attributes. The data model can thus be updated to better reflect the user's preferences.

Specific details were given in the preceding description to provide a thorough understanding of various implementations of systems and components for a menu personalization service. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for a menu personalization system.

What is claimed is:

1. A method implemented by a server computer on a network, comprising:
   receiving, over the network, input corresponding to a request for a personalized item list, wherein the input includes a user identifier associated with a user, and wherein the input is associated with a computing device on the network;
   reading a data store using the user identifier, the data store storing a plurality of data models associated with a plurality of user identifiers, each data model being customized based on data associated with a respective user identifier, wherein reading the data store results in obtaining a particular data model associated with the user identifier;
   determining a geolocation associated with the user identifier;
   determining, using the geolocation, a list of menu items associated with an eatery, wherein the eatery is associated with the geolocation;
   inputting the list of menu items associated with the eatery including a listing of edible ingredients of each menu item into the data model, wherein the data model generates and outputs a selection probability value for each menu item in the list of menu items, the selection probability indicating a likelihood of the user selecting a corresponding menu item based on the user's preference of the edible ingredients of the menu item;
   sorting the list of menu items according to the selection probability value associated with each menu item;
   generating the personalized item list based on the sorted list of menu items, the personalized item list including one or more of the menu items and corresponding edible ingredients;
   associating numerical scores with each of the one or more menu items in the personalized item list;
   determining a current time;
   modifying the numerical scores according to the current time;
   re-sorting the personalized item list according to the modified numerical scores; and
   outputting the re-sorted personalized item list including the one or more menu items and corresponding edible ingredients onto the network for receipt by the computing device.

2. The method of claim 1, wherein the user's preference is based on a time of day or a day of week.

3. The method of claim 1, further comprising:
   determining a recent item selection associated with the user identifier, wherein the recent item selection is determined from within a pre-determined time period preceding receipt of the input; and modifying the numerical scores according to the recent item selection.

4. The method of claim 1, further comprising:
reducing numerical scores for successive similar items in the personalized item list.

5. The method of claim 1, wherein determining the geolocation and generating the personalized item list occurs at a point in time prior to receiving the input, such that receiving the input results in outputting of the personalized item list.

6. The method of claim 1, wherein menu items that do not meet the user's dietary restriction are excluded from the personalized item list.

7. The method of claim 1, wherein the list of menu items is associated with a particular eatery within a pre-determined distance from the geolocation.

8. The method of claim 1, wherein each of the plurality of data models is trained using a machine learning method.

9. The method of claim 1, further comprising:
receiving input corresponding to an item selection; and
adding the item selection to the data model.

10. The method of claim 1, further comprising:
receiving input corresponding to a value associated with an item from the personalized item list, wherein the value is a positive value or a negative value; and
adding the value to the data model.

11. A server computer on a network, comprising: one or more processors; and
a non-transitory computer-readable medium including instructions that, when executed by the one or more processors, cause the one or more processors to perform operations including:
receiving, over the network, input corresponding to a request for a personalized item list, wherein the input includes a user identifier associated with a user, and wherein the input is associated with a computing device on the network;
reading a data store using the user identifier, the data store storing a plurality of data models associated with a plurality of user identifiers, each data model being customized based on data associated with a respective user identifier, wherein reading the data store results in obtaining a particular data model associated with the user identifier;
determining a geolocation associated with the user identifier;
determining, using the geolocation, a list of menu items associated with an eatery, wherein the eatery is associated with the geolocation;
inputting the list of menu items associated with the eatery including a listing of edible ingredients of each menu item into the data model, wherein the data model generates and outputs a selection probability value for each menu item in the list of menu items, the selection probability value indicating a likelihood of the user selecting a corresponding menu item based on the user's preference of the edible ingredients of the menu item;
sorting the list of menu items according to the selection probability value associated with each menu item;
generating the personalized item list based on the sorted list of menu items, the personalized item list including one or more of the menu items and corresponding edible ingredients;
associating numerical scores with each of the one or more menu items in the personalized item list;

determining a current time;
modifying the numerical scores according to the current time;
re-sorting the personalized item list according to the modified numerical scores; and
outputting the re-sorted personalized item list including the one or more menu items and corresponding edible ingredients onto the network for receipt by the computing device.

12. The server computer of claim 11, wherein the user's preference is based on a time of day or a day of week.

13. The server computer of claim 11, wherein the operations further include:
associating numerical scores with each item in the personalized item list; and
re-sorting the personalized item list according to the numerical scores.

14. The server computer of claim 11, wherein determining the geolocation and generating the personalized item list occurs at a point in time prior to receiving the input, such that receiving the input results in outputting of the personalized item list.

15. A computer-program product tangibly embodied in a non-transitory machine-readable storage medium, including instructions that, when executed by one or more processors of a computing device on a network, cause the one or more processors to:
receive, over the network, input corresponding to a request for a personalized item list, wherein the input includes a user identifier associated with a user, and wherein the input is associated with a computing device on the network;
read a data store using the user identifier, the data store storing a plurality of data models associated with a plurality of user identifiers, each data model being customized based on data associated with a respective user identifier, wherein reading the data store results in obtaining a particular data model associated with the user identifier;
determine a geolocation associated with the user identifier;
determine, using the geolocation, a list of menu items associated with an eatery, wherein the eatery is associated with the geolocation;
input the list of menu items associated with the eatery including a listing of edible ingredients of each menu item into the data model, wherein the data model generates and outputs a selection probability value for each menu item in the list of menu items, the selection probability value indicating a likelihood of the user selecting a corresponding menu item based on the user's preference of the edible ingredients of the menu item;
sort the list of menu items according to the selection probability value associated with each menu item;
generate the personalized item list based on the sorted list of menu items, the personalized item list including one or more of the menu items and corresponding edible ingredients;
associate numerical scores with each of the one or more menu items in the personalized item list;
determine a current time;
modify the numerical scores according to the current time;
re-sort the personalized item list according to the modified numerical scores; and output the re-sorted personalized item list including the one or more menu items and corresponding edible ingredients onto the network for receipt by the computing device.

16. The computer-program product of claim 15, wherein the user's preference is based on a time of day or a day of week.

17. The computer-program product of claim 15, wherein menu items that do not meet the user's dietary restriction are excluded from the personalized item list.

* * * * *